(12) United States Patent　　(10) Patent No.: US 10,983,721 B2
Yang et al.　　(45) Date of Patent: Apr. 20, 2021

(54) DETERMINISTIC FINITE AUTOMATA NODE CONSTRUCTION AND MEMORY MAPPING FOR REGULAR EXPRESSION ACCELERATOR

(71) Applicant: Fungible, Inc., Santa Clara, CA (US)

(72) Inventors: Yi-Hua Edward Yang, San Jose, CA (US); Rajan Goyal, Saratoga, CA (US); Eric Scot Swartzendruber, Austin, TX (US)

(73) Assignee: Fungible, Inc., Santa Clara, CA (US)

( * ) Notice: Subject to any disclaimer, the term of this patent is extended or adjusted under 35 U.S.C. 154(b) by 467 days.

(21) Appl. No.: 16/035,457

(22) Filed: Jul. 13, 2018

(65) Prior Publication Data

US 2020/0019339 A1　　Jan. 16, 2020

(51) Int. Cl.
*G06F 3/06*　　(2006.01)
*G06F 16/901*　　(2019.01)

(52) U.S. Cl.
CPC .......... *G06F 3/0656* (2013.01); *G06F 3/0604* (2013.01); *G06F 3/0673* (2013.01); *G06F 16/9024* (2019.01)

(58) Field of Classification Search
CPC ...... G06F 3/067; G06F 3/0605; G06F 3/0659; G06F 3/0613; G06F 3/0689
USPC ......................................................... 711/154
See application file for complete search history.

(56) References Cited

U.S. PATENT DOCUMENTS

| | | |
|---|---|---|
| 6,191,782 B1 | 2/2001 | Mori et al. |
| 7,308,446 B1 | 12/2007 | Panigrahy et al. |
| 7,805,392 B1 | 9/2010 | Steele et al. |
| 7,949,683 B2 | 5/2011 | Goyal |
| 8,055,601 B2 | 11/2011 | Pandya |
| 8,086,609 B2 | 12/2011 | Goyal et al. |
| 8,176,300 B2 | 5/2012 | Goyal et al. |
| 8,180,803 B2 | 5/2012 | Goyal |

(Continued)

FOREIGN PATENT DOCUMENTS

| | | |
|---|---|---|
| DE | 112012002624 T5 | 4/2014 |
| EP | 2215563 A1 | 8/2010 |

(Continued)

OTHER PUBLICATIONS

Response to Office Action dated Nov. 21, 2019, from U.S. Appl. No. 16/035,478, filed Feb. 21, 2020, 27 pp.

(Continued)

*Primary Examiner* — Son T Dinh
(74) *Attorney, Agent, or Firm* — Shumaker & Sieffert, P.A.

(57) ABSTRACT

An example processing device includes a memory including a discreet finite automata (DFA) buffer configured to store at least a portion of a DFA graph, the DFA graph comprising a plurality of nodes, each of the nodes having zero or more arcs each including a respective label and pointing to a respective subsequent node of the plurality of nodes, at least one of the plurality of nodes comprising a match node, wherein the at least portion of the DFA graph comprises one or more slots of a memory slice, the one or more slots comprising data representing one or more of the arcs for at least one node of the plurality of nodes, and a DFA engine implemented in circuitry, the DFA engine comprising one or more DFA threads implemented in circuitry and configured to evaluate a payload relative to the DFA graph.

36 Claims, 17 Drawing Sheets

(56) References Cited

U.S. PATENT DOCUMENTS

| | | | |
|---|---|---|---|
| 8,203,805 B2 | 6/2012 | Huang et al. | |
| 8,329,590 B2* | 12/2012 | Condrashoff | H01J 37/32623 |
| | | | 438/710 |
| 8,426,165 B2 | 4/2013 | Cho et al. | |
| 8,473,523 B2* | 6/2013 | Goyal | G06F 16/90344 |
| | | | 707/798 |
| 8,516,456 B1 | 8/2013 | Starovoitov et al. | |
| 8,726,253 B2 | 5/2014 | Glendenning et al. | |
| 8,819,217 B2 | 8/2014 | Hussain et al. | |
| 8,886,680 B2 | 11/2014 | Goyal | |
| 8,990,259 B2 | 3/2015 | Billa et al. | |
| 9,083,740 B1 | 7/2015 | Ma et al. | |
| 9,203,805 B2 | 12/2015 | Goyal et al. | |
| 9,304,768 B2 | 4/2016 | Ruehle | |
| 9,419,943 B2 | 8/2016 | Goyal et al. | |
| 9,426,165 B2 | 8/2016 | Billa et al. | |
| 9,426,166 B2 | 8/2016 | Billa et al. | |
| 9,438,561 B2 | 9/2016 | Goyal et al. | |
| 9,495,479 B2 | 11/2016 | Goyal | |
| 9,507,563 B2 | 11/2016 | Billa et al. | |
| 9,514,246 B2 | 12/2016 | Billa et al. | |
| 9,563,399 B2 | 2/2017 | Goyal et al. | |
| 9,602,532 B2 | 3/2017 | Goyal et al. | |
| 9,762,544 B2 | 9/2017 | Goyal et al. | |
| 9,785,403 B2 | 10/2017 | Goyal et al. | |
| 9,787,693 B2 | 10/2017 | Goyal et al. | |
| 9,823,895 B2 | 11/2017 | Goyal et al. | |
| 9,904,630 B2 | 2/2018 | Goyal et al. | |
| 10,110,558 B2 | 10/2018 | Goyal et al. | |
| 10,339,141 B2 | 7/2019 | Cafarella et al. | |
| 10,511,324 B1 | 12/2019 | Goyal et al. | |
| 10,540,288 B2 | 1/2020 | Noureddine et al. | |
| 10,565,112 B2 | 2/2020 | Noureddine et al. | |
| 10,635,419 B2 | 4/2020 | Yang et al. | |
| 10,645,187 B2* | 5/2020 | Goyal | H04L 67/2842 |
| 10,656,949 B2 | 5/2020 | Billa et al. | |
| 10,659,254 B2 | 5/2020 | Sindhu et al. | |
| 10,686,729 B2 | 6/2020 | Sindhu et al. | |
| 10,725,825 B2 | 7/2020 | Sindhu et al. | |
| 10,727,865 B2 | 7/2020 | Beckman et al. | |
| 10,761,931 B2 | 9/2020 | Goyal et al. | |
| 10,771,090 B2 | 9/2020 | Goyal et al. | |
| 2005/0229251 A1 | 10/2005 | Chellapilla et al. | |
| 2006/0069872 A1 | 3/2006 | Bouchard et al. | |
| 2006/0075206 A1 | 4/2006 | Bouchard et al. | |
| 2008/0101371 A1 | 5/2008 | Law et al. | |
| 2009/0138440 A1 | 5/2009 | Goyal | |
| 2010/0114973 A1 | 5/2010 | Goyal | |
| 2011/0016154 A1 | 1/2011 | Goyal et al. | |
| 2011/0107379 A1 | 5/2011 | LaJoie et al. | |
| 2012/0331554 A1 | 12/2012 | Goyal et al. | |
| 2013/0133064 A1 | 5/2013 | Goyal et al. | |
| 2013/0324900 A1 | 12/2013 | Wariar et al. | |
| 2014/0101187 A1 | 4/2014 | Chao et al. | |
| 2014/0129775 A1 | 5/2014 | Ruehle | |
| 2015/0067123 A1 | 3/2015 | Goyal et al. | |
| 2015/0067776 A1 | 3/2015 | Billa et al. | |
| 2015/0067863 A1 | 3/2015 | Billa et al. | |
| 2015/0295889 A1 | 10/2015 | Goyal et al. | |
| 2015/0295891 A1 | 10/2015 | Goyal et al. | |
| 2018/0287965 A1 | 10/2018 | Sindhu et al. | |
| 2018/0293168 A1 | 10/2018 | Noureddine et al. | |
| 2019/0012278 A1 | 1/2019 | Sindhu et al. | |
| 2019/0012350 A1 | 1/2019 | Sindhu et al. | |
| 2019/0013965 A1 | 1/2019 | Sindhu et al. | |
| 2019/0104206 A1 | 4/2019 | Goel et al. | |
| 2019/0104207 A1 | 4/2019 | Goel et al. | |
| 2019/0158428 A1 | 5/2019 | Gray et al. | |
| 2019/0182114 A1 | 6/2019 | Tavridis et al. | |
| 2019/0312915 A1 | 10/2019 | LaJoie et al. | |
| 2020/0019339 A1 | 1/2020 | Yang et al. | |
| 2020/0019391 A1 | 1/2020 | Yang et al. | |
| 2020/0019404 A1 | 1/2020 | Billa et al. | |
| 2020/0021664 A1 | 1/2020 | Goyal et al. | |
| 2020/0119903 A1 | 4/2020 | Thomas et al. | |
| 2020/0133771 A1 | 4/2020 | Goyal et al. | |
| 2020/0142642 A1 | 5/2020 | Billa et al. | |
| 2020/0145020 A1 | 5/2020 | Goyal et al. | |
| 2020/0145680 A1 | 5/2020 | Dikshit et al. | |
| 2020/0145681 A1 | 5/2020 | Dikshit et al. | |
| 2020/0145682 A1 | 5/2020 | Dikshit et al. | |
| 2020/0145683 A1 | 5/2020 | Dikshit | |
| 2020/0151101 A1 | 5/2020 | Noureddine et al. | |
| 2020/0159568 A1 | 5/2020 | Goyal et al. | |
| 2020/0159840 A1 | 5/2020 | Beckman et al. | |
| 2020/0159859 A1 | 5/2020 | Beckman et al. | |
| 2020/0162100 A1 | 5/2020 | Beckman et al. | |
| 2020/0162101 A1 | 5/2020 | Beckman et al. | |
| 2020/0162584 A1 | 5/2020 | Beckman et al. | |
| 2020/0169268 A1 | 5/2020 | Billa et al. | |
| 2020/0183841 A1 | 6/2020 | Noureddine et al. | |
| 2020/0228148 A1 | 7/2020 | Thomas et al. | |
| 2020/0250032 A1 | 8/2020 | Goyal et al. | |
| 2020/0278866 A1 | 9/2020 | Billa et al. | |

FOREIGN PATENT DOCUMENTS

| | | | |
|---|---|---|---|
| EP | 2215565 A1 | 8/2010 | |
| EP | 2276217 A2 | 1/2011 | |
| WO | 2003023553 A2 | 3/2003 | |
| WO | 2007079095 A2 | 7/2007 | |
| WO | 2009070191 A1 | 6/2009 | |
| WO | 2009070192 A1 | 6/2009 | |
| WO | 2012177736 A1 | 12/2012 | |
| WO | 2013078053 A1 | 5/2013 | |

OTHER PUBLICATIONS

Notice of Allowance from U.S. Appl. No. 16/035,416, dated Jan. 2, 2020, 9 pp.

Sidhu et al., "Fast Regular Expression Matching Using FPGAs," Proceedings of the 9th Annual IEEE Symposium on Field-Programmable Custom Computing Machines (FCCM'01), Apr. 29, 2001, pp. 227-238.

Ficara et al., "An Improved FDA for Fast Regular Expression Matching," ACM SIGCOMM Computer Communication Review, vol. 38, No. 5, Oct. 2008, pp. 29-40.

Kumar et al., "Advanced Algorithms for Fast and Scalable Deep Packet Inspection," Proceedings of the 2006 ACM/ IEEE Symposium, Dec. 3, 2006, pp. 81-92.

Becchi et al., "Evaluating Regular Expression Matching Engines on Network and General Purpose Processors," Proceedings of the 2009 ACM/IEEE Symposium on Architecture for Networking and Communications Systems, Oct. 19, 2009, pp. 30-39.

Bille et al., "Subsequence Automata with Default Transitions," Journal of Discrete Algorithms, vol. 44, Jun. 13, 2017, pp. 48-55.

Becchi et al., "Efficient Regular Expression Evaluation: Theory to Practice," Proceedings of the 2008 ACM/IEEE Symposium on Architecture for Networking and Communications Systems, Nov. 6, 2008, pp. 50-59.

Zheng et al., "Algorithms to Speedup Pattern Matching for Network Intrusion Detection Systems," Computer Communications, vol. 62, Feb. 2015. pp. 47-58.

Gogte et al., "HARE: Hardware Accelerator for Regular Expressions," 49th Annual IEEE/ACM International Symposium on Microarchitecture (MICRO), Oct. 2016, 12 pp.

Van Lunteren et al., "Designing a Programmable Wire-Speed Regular-Expression Matching Accelerator," 2012 IEEE/ACM 45th Annual International Symposium on Microarchitecture, Dec. 1-5, 2012, pp. 461-472.

Qi et al., "FEACAN: Front-End Acceleration for Content-Aware Network Processing," 2011 Proceedings IEEE INFOCOM, Apr. 10-15, 2011, pp. 2114-2122.

Office Action from U.S. Appl. No. 16/035,478, dated Nov. 21, 2019, 24 pp.

Notice of Allowance from U.S. Appl. No. 16/035,444, dated Sep. 25, 2019, 9 pp.

U.S. Appl. No. 16/035,416, filed Jul. 13, 2018, naming inventors Goyal et al.

(56) References Cited

OTHER PUBLICATIONS

U.S. Appl. No. 16/035,444, filed Jul. 13, 2018, naming inventors Yang et al.
U.S. Appl. No. 16/035,478, filed Jul. 13, 2018, naming inventors Billa et al.
"Sort Benchmark Home Page," retrieved from http://sortbenchmark.org/ on Feb. 4, 2020, 13 pp.
U.S. Appl. No. 16/144,689, filed Jun. 13, 2019, by Nayakam et al.
U.S. Appl. No. 16/157,265, filed Oct. 11, 2018, by Thomas et al.
U.S. Appl. No. 16/169,736, filed Oct. 24, 2018, by Goyal et al.
U.S. Appl. No. 16/178,373, filed Nov. 1, 2018, by Billa et al.
U.S. Appl. No. 16/179,472, filed Nov. 2, 2018, by Dikshit et al.
U.S. Appl. No. 16/179,496, filed Nov. 2, 2018, by Dikshit et al.
U.S. Appl. No. 16/179,529, filed Nov. 2, 2018, by Dikshit et al.
U.S. Appl. No. 16/179,558, filed Nov. 2, 2018, by Dikshit et al.
U.S. Appl. No. 16/195,209, filed Nov. 19, 2018, by Beckman et al.
U.S. Appl. No. 16/195,290, filed Nov. 19, 2018, by Beckman et al.
U.S. Appl. No. 16/195,564, filed Nov. 19, 2018, by Beckman et al.
U.S. Appl. No. 16/195,617, filed Nov. 19, 2018, by Beckman et al.
U.S. Appl. No. 16/195,644, filed Nov. 19, 2018, by Beckman et al.
U.S. Appl. No. 16/198,607, filed Nov. 21, 2018, by Goyal et al.
U.S. Appl. No. 16/200,484, filed Nov. 26, 2018, by Billa et al.
U.S. Appl. No. 16/249,658, filed Jan. 16, 2019, by Thomas et al.
U.S. Appl. No. 16/265,606, filed Feb. 1, 2019, by Goyal et al.
U.S. Appl. No. 16/584,293, filed Sep. 26, 2019, by Goyal et al.
U.S. Appl. No. 16/584,390, filed Sep. 26, 2019, by Billa et al.
U.S. Appl. No. 16/584,467, filed Sep. 26, 2019, by Billa et al.
Amendment in Response to Office Action dated Nov. 21, 2019, from U.S. Appl. No. 16/035,478, filed Feb. 21, 2020, 27 pp.
Notice of Allowance from U.S. Appl. No. 16/035,478, dated Mar. 4, 2020, 15 pp.
Notice of Allowance from U.S. Appl. No. 16/035,444, dated Jan. 29, 2020, 7 pp.
U.S. Appl. No. 16/825,664, filed Mar. 20, 2020, by Goyal et al.
U.S. Appl. No. 16/825,714, filed Mar. 20, 2020, by Goyal et al.
Office Action from U.S. Appl. No. 16/877,102, dated Aug. 27, 2020, 23 pp.

\* cited by examiner

| TIME | CACHE KEY | CACHE LOCATION | CACHE VALUE | |
|---|---|---|---|---|
| t0 | A, 222 | X001 | A, 222 = 224 | Effective |
| | | X002 | | |
| | | x003 | | |
| | | x004 | | |

| TIME | CACHE KEY | CACHE LOCATION | CACHE VALUE | |
|---|---|---|---|---|
| t1 | B, 224 | X001 | A, 222 = 224 | Effective |
| | | X002 | B, 224 = 323 | Effective |
| | | x003 | | |
| | | x004 | | |

| TIME | CACHE KEY | CACHE LOCATION | CACHE VALUE | |
|---|---|---|---|---|
| t2 | C, 232 | X001 | A, 222 = 224 | Effective |
| | | X002 | B, 224 = 323 | Effective |
| | | x003 | C, 232 = 222 | Negative |
| | | x004 | | |

| TIME | CACHE KEY | CACHE LOCATION | CACHE VALUE | |
|---|---|---|---|---|
| t3 | A, 222 | X001 | A, 222 = 224 | Effective |
| | | X002 | B, 224 = 323 | Effective |
| | | x003 | C, 232 = 222 | Negative |
| | | x004 | | |

| TIME | CACHE KEY | CACHE LOCATION | CACHE VALUE | |
|---|---|---|---|---|
| t4 | B, 224 | X001 | A, 222 = 224 | Effective |
| | | X002 | B, 224 = 323 | Effective |
| | | x003 | C, 232 = 222 | Negative |
| | | x004 | | |

| TIME | CACHE KEY | CACHE LOCATION | CACHE VALUE | |
|---|---|---|---|---|
| t5 | D, 232 | X001 | A, 222 = 224 | Effective |
| | | X002 | B, 224 = 323 | Effective |
| | | x003 | C, 232 = 222 | Negative |
| | | x004 | D, 232 = 244 | Effective |

FIG. 10D

DETERMINISTIC FINITE AUTOMATA NODE CONSTRUCTION AND MEMORY MAPPING FOR REGULAR EXPRESSION ACCELERATOR

TECHNICAL FIELD

The disclosure relates to processing packets of information, for example, in the fields of networking and storage.

BACKGROUND

In a typical computer network, a large collection of interconnected servers provides computing and/or storage capacity for execution of various applications. A data center is one example of a large-scale computer network and typically hosts applications and services for subscribers, i.e., customers of the data center. The data center may, for example, host all of the infrastructure equipment, such as compute nodes, networking and storage systems, power systems, and environmental control systems. In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy.

Many devices within a computer network, e.g., storage/compute servers, firewalls, intrusion detection devices, switches, routers or other network attached devices, often use general purpose processors, including multi-core processing systems, to process data, such as network or storage data. However, general purpose processing cores and multi-processing systems are normally not designed for high-capacity network and storage workloads of modern networks and can be relatively poor at performing packet stream processing.

SUMMARY

In general, this disclosure describes a highly programmable device, referred to generally as a data processing unit, having multiple processing units for processing streams of information, such as network packets or storage packets. In some examples, the processing units may be processing cores, and in other examples, the processing units may be virtual processors, hardware threads, hardware blocks, or other sub-processing core units. As described herein, the data processing unit includes one or more specialized hardware-based accelerators configured to perform acceleration for various data-processing functions, thereby offloading tasks from the processing units.

In various examples, this disclosure describes a programmable, hardware-based accelerator unit configured to apply and evaluate regular expressions against high-speed data streams. The accelerator unit may include a hardware implementation of a regular expression (RegEx) evaluator, and thus, may be referred to herein as a RegEx accelerator unit, or simply a RegEx accelerator. In particular, the RegEx accelerator unit may be configured to process one or more deterministic finite automata (DFA) to evaluate regular expressions against particular data units of the data streams. Regular expressions generally define a pattern of characters, expressed in a regular language, to be identified in an input sequence of characters, such as one or more payloads of one or more packets. The RegEx accelerator of this disclosure may be configured to identify occurrences of one or more target strings defined by one or more respective regular expressions in a set of one or more payloads of packets using one or more DFAs. The RegEx accelerator may be used as part of various data processing services, such as intrusion detection and prevention (IDP), anti-virus scanning, search, indexing, and the like.

In one example, a processing device includes a memory including a deterministic finite automata (DFA) buffer configured to store at least a portion of a DFA graph, the DFA graph comprising a plurality of nodes, each of the nodes having zero or more arcs each including a respective label and pointing to a respective subsequent node of the plurality of nodes, at least one of the plurality of nodes comprising a match node, at least one of the plurality of nodes comprising a match node, wherein the at least portion of the DFA graph comprises one or more slots of a memory slice, the one or more slots comprising data representing one or more of the arcs for at least one node of the plurality of nodes, and a DFA engine implemented in circuitry, the DFA engine comprising one or more DFA threads implemented in circuitry, each of the DFA threads comprising a current node memory storing a value representing a current node of the plurality of nodes in the DFA graph, and a payload offset memory storing a value representing a position of current symbol in a sequence of symbols of payload data, the DFA engine further comprising a processing unit configured to determine a label of one of the arcs of the current node that matches the current symbol, update the value of the current node memory to a value representative of the respective subsequent node of the one of the arcs having the label that matches the current symbol, and increment the value of the payload offset memory. In response to updating the value of the current node memory to correspond to the match node, the DFA engine is configured to output an indication that the payload data has resulted in a match.

In another example, a method comprising storing, by a deterministic finite automata (DFA) engine of a processing device, the DFA engine implemented in circuitry, at least a portion of a DFA graph to a DFA buffer of a memory, the DFA graph comprising a plurality of nodes, each of the nodes having zero or more arcs each including a respective label and pointing to a respective subsequent node of the plurality of nodes, at least one of the plurality of nodes comprising a match node, wherein storing the at least portion of the DFA graph comprises storing a memory slice comprising data representing one or more of the arcs for at least one node of the plurality of nodes, determining, by a DFA thread of the DFA engine, the DFA thread implemented in circuitry, a value of a current node memory representing a current node of the plurality of nodes in the DFA graph, determining, by the DFA thread, a value of a payload offset memory representing a position of current symbol in a sequence of symbols of payload data, determining, by the DFA thread, a label of one of the arcs of the current node that matches the current symbol, updating, by the DFA thread, the value of the current node memory to a value representative of the respective subsequent node of the one of the arcs having the label that matches the current symbol, incrementing, by the DFA thread, the value of the payload offset memory, and in response to updating the value of the current node memory to correspond to the match node, outputting, by the DFA thread, an indication that the payload data has resulted in a match.

In another example, a processing device includes a processor configured to execute a compiler to compile a regular expression to form a deterministic finite automata (DFA)

graph, the DFA graph comprising a plurality of nodes, each of the nodes having zero or more arcs each including a respective label and pointing to a respective subsequent node of the plurality of nodes, at least one of the plurality of nodes comprising a match node, and wherein the compiler is configured to allocate data for the nodes between buffer memory of one or more deterministic finite automata (DFA) engines of a regular expression accelerator unit and an external memory to the regular expression accelerator unit.

In another example, a processing device includes a regular expression processing unit comprising a buffer memory, one or more deterministic finite automata (DFA) engines implemented in circuitry, and an interface to an external memory, at least one of the DFA engines being configured to store a first portion of a DFA graph in the buffer memory and a second portion in the external memory, the DFA graph comprising a plurality of nodes, each of the nodes having zero or more arcs each including a respective label and pointing to a respective subsequent node of the plurality of nodes, at least one of the plurality of nodes comprising a match node, wherein a first node of the DFA graph is stored in the buffer memory or the external memory in a hash mode such that arcs for the first node are stored in two or more memory slices of the buffer memory or the external memory according to one or more hash functions, and wherein a second node of the DFA graph is stored in the buffer memory or the external memory in a fill mode such that arcs for the second node are stored in one of the two or more memory slices.

The details of one or more examples are set forth in the accompanying drawings and the description below. Other features, objects, and advantages will be apparent from the description and drawings, and from the claims.

BRIEF DESCRIPTION OF DRAWINGS

FIG. 10D is a conceptual diagram illustrating logical views of a cache of an example RegEx accelerator, in accordance with the techniques of this disclosure.

DETAILED DESCRIPTION

Figure 1:
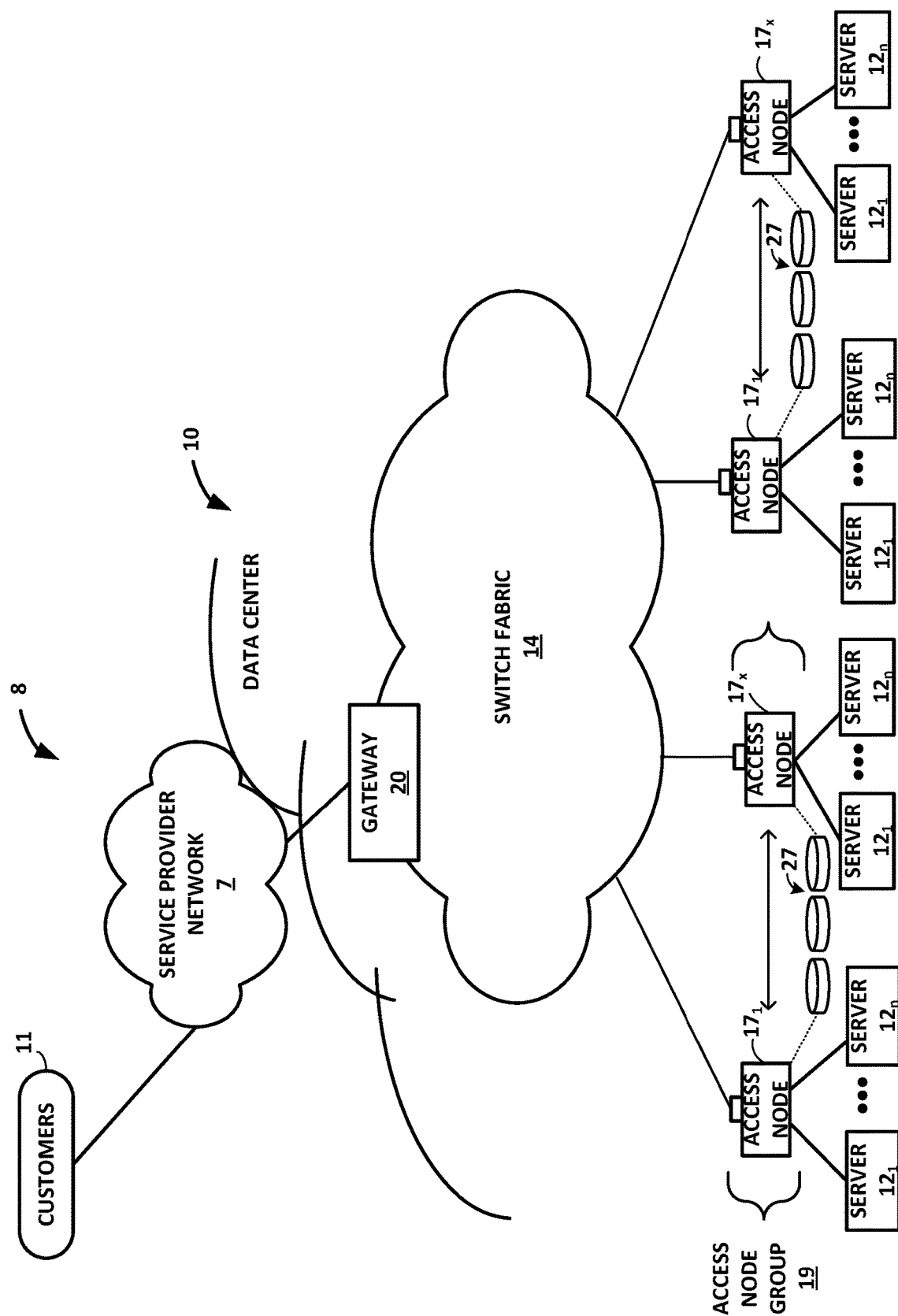
FIG. 1 is a block diagram illustrating an example system including one or more network devices configured to efficiently process a series of work units in a multiple core processor system.

FIG. 1 is a block diagram illustrating an example system 8 including one or more network devices configured to efficiently process a series of work units in a multiple core processor system. As described herein, techniques for caching and prefetching data from non-coherent memory may provide technical benefits that include improving the efficiency and utilization of processing cores within access nodes 17 in FIG. 1. Access nodes may also be referred to as data processing units (DPUs), or devices including DPUs, in this disclosure. In the example of FIG. 1, various data structures and processing techniques are described with respect to access nodes 17 within a data center 10. Other devices within a network, such as routers, switches, servers, firewalls, gateways and the like, having multiple core processor systems may readily be configured to utilize the data processing techniques described herein.

Data center 10 represents an example of a system in which various techniques described herein may be implemented. In general, data center 10 provides an operating environment for applications and services for customers 11 coupled to the data center by service provider network 7 and gateway device 20. Data center 10 may, for example, host infrastructure equipment, such as compute nodes, networking and storage systems, redundant power supplies, and environmental controls. Service provider network 7 may be coupled to one or more networks administered by other providers, and may thus form part of a large-scale public network infrastructure, e.g., the Internet. In other examples, service provider network 7 may be a data center wide-area network (DC WAN), private network or other type of network.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In the illustrated example, data center 10 includes a set of storage systems and application servers 12 interconnected via a high-speed switch fabric 14. In some examples, servers 12 are arranged into multiple different server groups, each including any number of servers up to, for example, n servers $12_1$-$12_n$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1, each of servers 12 is coupled to switch fabric 14 by an access node 17 for processing streams of information, such as network packets or storage packets. In example implementations, access nodes 17 may be configurable to operate in a standalone network appliance having one or more access nodes. For example, access nodes 17 may be arranged into multiple different access node groups 19, each including any number of access nodes up to, for example, x access nodes $17_1$-$17_x$. In other examples, each access node may be implemented as a component (e.g., electronic chip) within a device, such as a compute node, application server, storage server, and may be deployed on a motherboard of the device or within a removable card, such as a storage and/or network interface card.

In general, each access node group 19 may be configured to operate as a high-performance I/O hub designed to aggregate and process network and/or storage I/O for multiple servers 12. As described above, the set of access nodes 17 within each of the access node groups 19 provide highly-programmable, specialized I/O processing circuits for handling networking and communications operations on behalf of servers 12. In addition, in some examples, each of access node groups 19 may include storage devices 27, such as solid state drives (SSDs) and/or hard disk drives (HDDs), configured to provide network accessible storage for use by applications executing on the servers 12. In some examples, one or more of the SSDs may comprise non-volatile memory (NVM) or flash memory. Each access node group 19, including its set of access nodes 17 and storage devices 27, and the set of servers 12 supported by the access nodes 17 of that access node group 19 may be referred to herein as a network storage compute unit.

As further described herein, in one example, each access node 17 is a highly programmable I/O processor (referred to as a data processing unit, or DPU) specially designed for offloading certain functions from servers 12. In one example, each access node 17 includes a number of internal processor clusters, each including two or more processing cores and equipped with hardware engines that offload cryptographic functions, compression and decompression, regular expression (RegEx) processing, data storage functions, and networking operations. In this way, each access node 17 includes components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers. Additional example details of various example DPUs are described in U.S. Provisional Patent Application No. 62/559,021, filed Sep. 15, 2017, entitled "Access Node for Data Centers," and U.S. Provisional Patent Application No. 62/530,691, filed Jul. 10, 2017, entitled "Data Processing Unit for Computing Devices," the entire contents of both being incorporated herein by reference.

In accordance with the techniques of this disclosure, any or all of access nodes 17 may include a regular expression (RegEx) accelerator unit. That is, one or more computing devices may include an access node including one or more RegEx accelerator units, according to the techniques of this disclosure.

The RegEx accelerator unit of the access node, according to the techniques of this disclosure, may be configured to process payloads of packets during various services as the packets are exchanged by access nodes 17, e.g., between access nodes 17 via switch fabric 14 and/or between servers 12. That is, as packets are exchanged between the devices, either for networking or data storage and retrieval, the access node may perform an evaluation service on payloads of the packet. For example, the access node may provide evaluation services in the form of intrusion detection, intrusion prevention, intrusion detection and prevention (IDP), anti-virus scanning, search, indexing, or the like. The access node may use one or more RegEx accelerator units to identify patterns in payload data, such as virus definitions, attempted intrusions, search strings, indexing strings, or the like. The patterns may be defined according to respective regular expressions. According to the techniques of this disclosure, each of the RegEx accelerator units may include a hardware implementation of a regular expression evaluator, which may construct one or more deterministic finite automata (DFAs) according to the regular expressions for the patterns.

In the example of FIG. 1, each access node 17 provides connectivity to switch fabric 14 for a different group of servers 12 and may be assigned respective IP addresses and provide routing operations for the servers 12 coupled thereto. Access nodes 17 may interface with and utilize switch fabric 14 so as to provide full mesh (any-to-any) interconnectivity such that any of servers 12 may communicate packet data for a given packet flow to any other of the servers using any of a number of parallel data paths within the data center 10. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. More details on the example data center network architecture and interconnected access nodes illustrated in FIG. 1 are available in U.S. patent application Ser. No. 15/939,227, filed Mar. 28, 2018, entitled "Non-Blocking Any-to-Any Data Center Network with Packet Spraying Over Multiple Alternate Data Paths," the entire content of which is incorporated herein by reference.

Various example architectures of access nodes 17 are described below with respect to FIGS. 2, 3, 4A, and 4B. With respect to either example, the architecture of each access node 17 comprises a multiple core processor system that represents a high performance, hyper-converged network, storage, and data processor and input/output hub. The architecture of each access node 17 is optimized for high performance and high efficiency stream processing.

In general, a stream, also referred to as a data stream, may be viewed as an ordered, unidirectional sequence of computational objects that can be of unbounded or undetermined length. In a simple example, a stream originates in a producer and terminates at a consumer, is operated on sequentially, and is flow-controlled. In some examples, a stream can be defined as a sequence of stream fragments, each representing a portion of data communicated by a stream. In one example, a stream fragment may include a memory block contiguously addressable in physical address space, an offset into that block, and a valid length. Streams can be discrete, such as a sequence of packets received from a network, or continuous, such as a stream of blocks, words, or bytes read from a storage device. A stream of one type may be transformed into another type as a result of processing. Independent of the stream type, stream manipulation requires efficient fragment manipulation. An application executing on one of access nodes 17 may operate on a stream in three broad ways: the first is protocol processing, which consists of operating on control information or headers within the stream; the second is payload processing, which involves significant accessing of the data within the stream; and third is some combination of both control and data access.

Stream processing is a specialized type of conventional general-purpose processing supporting specialized limitations with regard to both access and directionality. Processing typically only accesses a limited portion of the stream at any time, called a "window," within which it may access random addresses. Objects outside of the window are not accessible through a streaming interface. In contrast, general purpose processing views the whole memory as randomly accessible at any time. In addition, stream processing generally progresses in one direction, called the forward direction. These characteristics make stream processing amenable to pipelining, as different processors within one of access nodes 17 can safely access different windows within the stream.

As described herein, data processing units of access nodes 17 may process stream information by managing "work units." In general, a Work Unit (WU) is a container that is associated with a stream state and used to describe (i.e. point to) data within a stream (stored in memory) along with any associated meta-data and operations to be performed on the data. In the example of FIG. 1, streams of data units may dynamically originate within a peripheral unit of one of access nodes 17 (e.g. injected by a networking unit, a host unit, or a solid state drive interface), or within a processor of the one of access nodes 17, in association with one or more streams of data, and terminate at another peripheral unit or another processor of the one of access nodes 17. Each work unit maintained by a data processing unit is associated with an amount of work that is relevant to the entity executing the work unit for processing a respective portion of a stream.

Stream processing is typically initiated as a result of receiving one or more data units associated with respective portions of the stream and constructing and managing work units for processing respective portions of the data stream. In protocol processing, a portion would be a single buffer (e.g. packet), for example. Within access nodes 17, work units may be executed by processor cores, hardware blocks, I/O interfaces, or other computational processing units. For instance, a processor core of an access node 17 executes a work unit by accessing the respective portion of the stream from memory and performing one or more computations in accordance with the work unit. A component of the one of access nodes 17 may receive, execute or generate work units. A succession of work units may define how the access node processes a flow, and smaller flows may be stitched together to form larger flows.

For purposes of example, DPUs of or within each access node 17 may execute an operating system, such as a general-purpose operating system (e.g., Linux or other flavor of Unix) or a special-purpose operating system, that provides an execution environment for data plane software for data processing. Moreover, each DPU may be configured to utilize a work unit (WU) stack data structure (referred to as a 'WU stack' in a multiple core processor system. As described herein, the WU stack data structure may provide certain technical benefits, such as helping manage an event driven, run-to-completion programming model of an operating system executed by the multiple core processor system. The WU stack, in a basic form, may be viewed as a stack of continuation WUs used in addition to (not instead of) a program stack maintained by the operating system as an efficient means of enabling program execution to dynamically move between cores of the access node while performing high-rate stream processing. As described below, a WU data structure is a building block in the WU stack and can readily be used to compose a processing pipeline and services execution in a multiple core processor system. The WU stack structure carries state, memory, and other information in auxiliary variables external to the program stack for any given processor core. In some implementations, the WU stack may also provide an exception model for handling abnormal events and a 'success bypass' to shortcut a long series of operations. Further, the WU stack may be used as an arbitrary flow execution model for any combination of pipelined or parallel processing.

As described herein, access nodes 17 may process WUs through a plurality of processor cores arranged as processing pipelines within access nodes 17, and such processing cores may employ techniques to encourage efficient processing of such work units and high utilization of processing resources. For instance, a processing core (or a processing unit within a core) may, in connection with processing a series of work units, access data and cache the data into a plurality of segments of a level 1 cache associated with the processing core. In some examples, a processing core may process a work unit and cache data from non-coherent memory in a segment of the level 1 cache. The processing core may also concurrently prefetch data associated with a work unit expected to be processed in the future into another segment of the level 1 cache associated with the processing core. By prefetching the data associated with the future work unit in advance of the work unit being dequeued from a work unit queue for execution by the core, the processing core may be able to efficiently and quickly process a work unit once the work unit is dequeued and execution of the work unit is to commence by the processing core. More details on work units and stream processing by data processing units of access nodes are available in U.S. Provisional Patent Application No. 62/589,427, filed Nov. 21, 2017, entitled "Work Unit Stack Data Structures in Multiple Core Processor System," and U.S. Provisional Patent Application No. 62/625,518, entitled "EFFICIENT WORK UNIT PROCESSING IN A MULTICORE SYSTEM", filed Feb. 2, 2018, the entire contents of both being incorporated herein by reference.

As described herein, the data processing units for access nodes 17 includes one or more specialized hardware-based accelerators configured to perform acceleration for various data-processing functions, thereby offloading tasks from the processing units when processing work units. That is, each accelerator is programmable by the processing cores, and one or more accelerators may be logically chained together to operate on stream data units, such as by providing cryptographic functions, compression and regular expression (RegEx) processing, data storage functions and networking operations. This disclosure describes a programmable, hardware-based accelerator unit configured to apply and evaluate regular expressions against high-speed data streams. The accelerator unit may include a hardware implementation of a regular expression (RegEx) evaluator, and thus, may be referred to herein as a RegEx accelerator unit, or simply a RegEx accelerator. In particular, the RegEx accelerator unit may be configured to process one or more deterministic finite automata (DFA) to evaluate regular expressions against particular data units of the data streams.

In some examples, the RegEx accelerator unit is configured to speculatively access an internal cache of the RegEx accelerator unit to evaluate a payload. That is, the RegEx accelerator unit may include a cache (e.g., a L1 cache) that is configured to enable access to multiple portions of the cache simultaneously. For example, the cache may include two input ports and two output ports and be configured to concurrently receive two different hash keys and in response, output two different results based on the inputted keys in parallel. The RegEx accelerator unit may store two or more "node representations" that are each indicative of arcs, and corresponding labels, exiting a particular node of a DFA graph in the cache. In this way, rather than access a memory of the RegEx accelerator unit that stores an entire DFA graph, the RegEx accelerator unit may operate more efficiently and with lower latency by accessing multiple node representations in its internal cache, in parallel.

Figure 2:
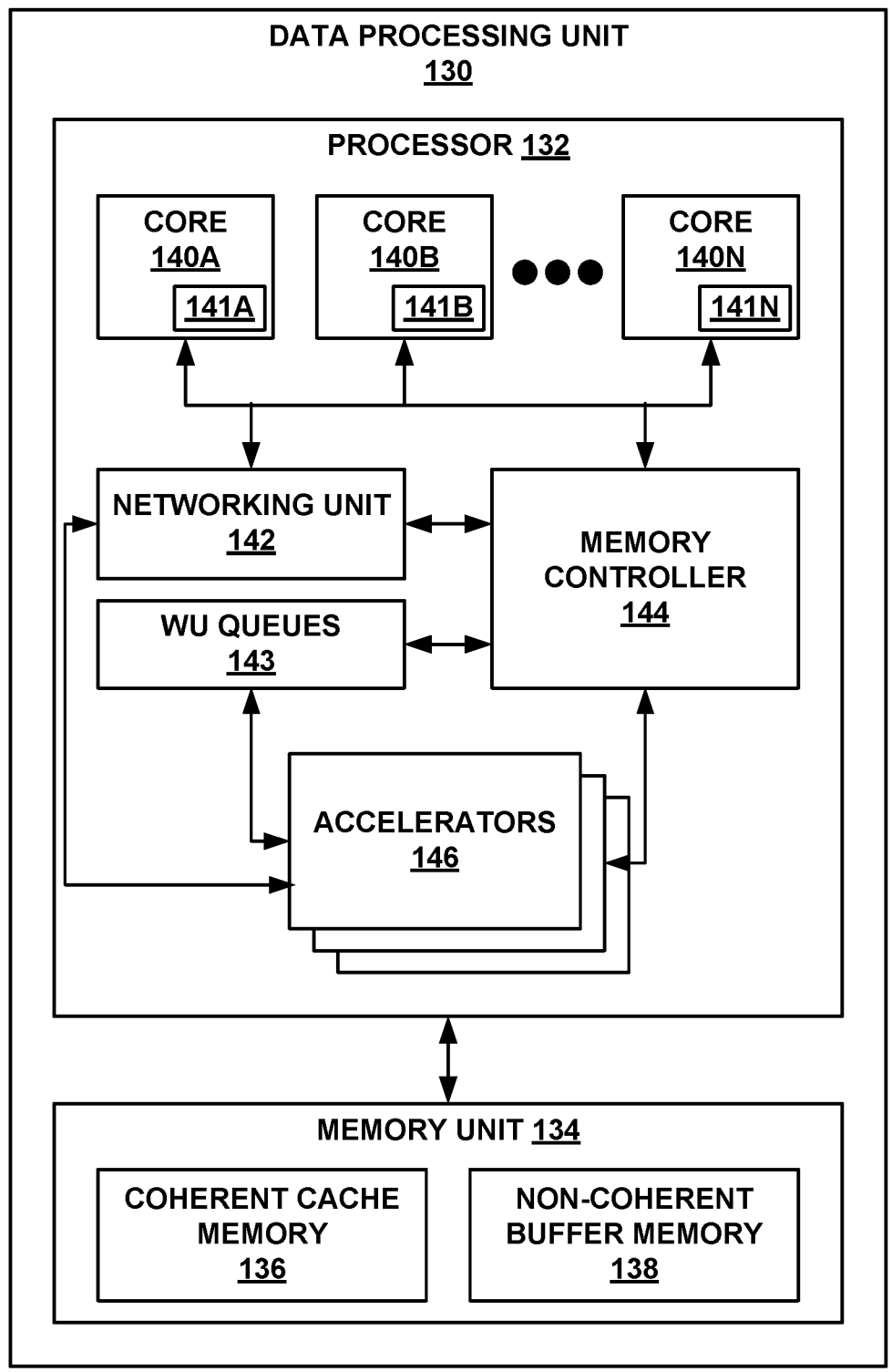
FIG. 2 is a block diagram illustrating an example data processing unit (DPU) including two or more processing clusters, in accordance with the techniques of this disclosure.

FIG. 2 is a block diagram illustrating an example data processing unit (DPU) 130 including two or more processing cores, in accordance with the techniques of this disclosure. DPU 130 generally represents a hardware chip implemented in digital logic circuitry and may be used in any computing or network device. DPU 130 may operate substantially similar to and generally represent any of access nodes 17 of FIG. 1. Thus, DPU 130 may be communicatively coupled to one or more network devices, server devices (e.g., servers 12), random access memory, storage media (e.g., solid state drives (SSDs)), a data center fabric (e.g., switch fabric 14), or the like, e.g., via PCI-e, Ethernet (wired or wireless), or other such communication media. Moreover, DPU 130 may be implemented as one or more application-specific integrated circuit (ASIC), may be configurable to operate as a component of a network appliance or may be integrated with other DPUs within a device.

In the illustrated example of FIG. 2, DPU 130 includes a multi-core processor 132 having a plurality of programmable processing cores 140A-140N ("cores 140") coupled to an on-chip memory unit 134. Each of cores 140 includes a level 1 cache 141 (level 1 caches 141a, 141b, and 141n are associated with cores 140a, 140b, and 140n, respectively).

Memory unit 134 may include two types of memory or memory devices, namely coherent cache memory 136 and non-coherent buffer memory 138. Processor 132 also includes a networking unit 142, work unit (WU) queues 143, a memory controller 144, and accelerators 146. As illustrated in FIG. 2, each of cores 140, networking unit 142, WU queues 143, memory controller 144, memory unit 134, and accelerators 146 are communicatively coupled to each other. Processor 132 of DPU 130 further includes one or more accelerators 146 configured to perform acceleration for various data-processing functions, such as look-ups, matrix multiplication, cryptography, compression, regular expressions, or the like.

In this example, DPU 130 represents a high performance, hyper-converged network, storage, and data processor and input/output hub. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as switch fabric 14 of FIG. 1. DPU 130 may also include one or more interfaces for connectivity to host devices (e.g., servers) and data storage devices, e.g., solid state drives (SSDs) via PCIe lanes. DPU 130 may further include one or more high bandwidth interfaces for connectivity to off-chip external memory.

Processor 132 further includes accelerators 146 configured to perform acceleration for various data-processing functions, such as look-ups, matrix multiplication, cryptography, compression, regular expressions, or the like. For example, accelerators 146 may comprise hardware implementations of look-up engines, matrix multipliers, cryptographic engines, compression engines, or the like. The functionality of different hardware accelerators is described is more detail below with respect to FIG. 4. In accordance with the techniques of this disclosure, at least one of accelerators 146 represents a hardware implementation of a regular expression engine. In particular, according to the techniques of this disclosure, accelerators 146 include at least one RegEx accelerator that includes one or more DFA engines configured to execute DFAs representing regular expressions, as discussed in greater detail below.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. More details on the bifurcated memory system included in the DPU are available in U.S. Provisional Patent Application No. 62/483,844, filed Apr. 10, 2017, and titled "Relay Consistent Memory Management in a Multiple Processor System," the entire content of which is incorporated herein by reference.

Cores 140 may comprise one or more microprocessors without interlocked pipeline stages (MIPS) cores, reduced instruction set computing (RISC) cores, advanced RISC machine (ARM) cores, performance optimization with enhanced RISC—performance computing (PowerPC) cores, RISC Five (RISC-V) cores, or complex instruction set computing (CISC or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

Each of level 1 caches 141 may include a plurality of cache lines logically or physically divided into cache segments. Each of level 1 caches 141 may be controlled by a load/store unit also included within the core. The load/store unit may include logic for loading data into cache segments and/or cache lines from non-coherent buffer memory 138 and/or memory external to DPU 130. The load/store unit may also include logic for flushing cache segments and/or cache lines to non-coherent buffer memory 138 and/or memory external to DPU 130. In some examples, the load/store unit may be configured to prefetch data from main memory during or after a cache segment or cache line is flushed.

As described herein, processor cores 140 may be arranged as processing pipelines, and such processing cores may employ techniques to encourage efficient processing of such work units and high utilization of processing resources. For instance, any of processing cores 140 (or a processing unit within a core) may, in connection with processing a series of work units retrieved from WU queues 143, access data and cache the data into a plurality of segments of level 1 cache 141 associated with the processing core. In some examples, a processing core 140 may process a work unit and cache data from non-coherent memory 138 in a segment of the level 1 cache 141. As described herein, concurrent with execution of work units by cores 140, a load store unit of memory controller 144 may be configured to prefetch, from non-coherent memory 138, data associated with work units within WU queues 143 that are expected to be processed in the future, e.g., the WUs now at the top of the WU queues and next in line to be processed. For each core 140, the load store unit of memory controller 144 may store the prefetched data associated with the WU to be processed by the core into a standby segment of the level 1 cache 141 associated with the processing core 140.

In some examples, the plurality of cores 140 executes instructions for processing a plurality of events related to each data packet of one or more data packets, received by networking unit 142, in a sequential manner in accordance with one or more work units associated with the data packets. As described above, work units are sets of data exchanged between cores 140 and networking unit 142 where each work unit may represent one or more of the events related to a given data packet.

As one example use case, stream processing may be divided into work units executed at a number of intermediate processors between source and destination. Depending on the amount of work to be performed at each stage, the number and type of intermediate processors that are involved may vary. In processing a plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

As another example use case, transfer of ownership of a memory buffer between processing cores may be mediated by a work unit message delivered to one or more of processing cores 140. For example, the work unit message may be a four-word message including a pointer to a memory buffer. The first word may be a header containing information necessary for message delivery and information used for work unit execution, such as a pointer to a function for execution by a specified one of processing cores 140. Other words in the work unit message may contain parameters to be passed to the function call, such as pointers to data in memory, parameter values, or other information used in executing the work unit.

In one example, receiving a work unit is signaled by receiving a message in a work unit receive queue (e.g., one of WU queues 143). The one of WU queues 143 is associated with a processing element, such as one of cores 140, and is addressable in the header of the work unit message. One of cores 140 may generate a work unit message by executing stored instructions to addresses mapped to a work unit transmit queue (e.g., another one of WU queues 143). The stored instructions write the contents of the message to the queue. The release of a work unit message may be interlocked with (gated by) flushing of the core's dirty cache data and in some examples, prefetching into the cache of data associated with another work unit for future processing.

Figure 3:
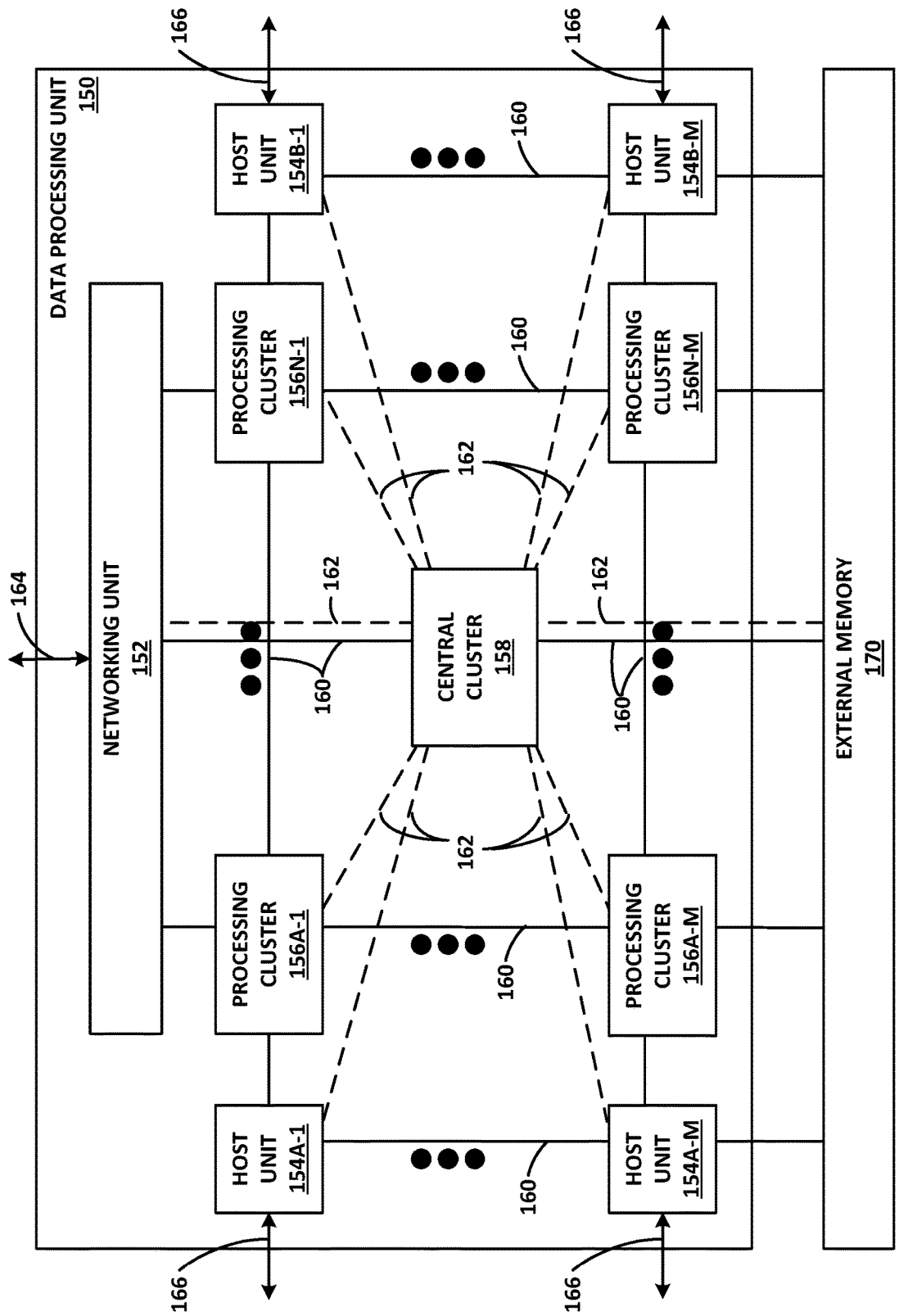
FIG. 3 is a block diagram illustrating another example data processing unit including two or more processing clusters, in accordance with the techniques of this disclosure.

FIG. 3 is a block diagram illustrating one example of a DPU 150 including a networking unit, at least one host unit, and two or more processing clusters. DPU 150 may operate substantially similar to any of the access nodes 17 of FIG. 1. Thus, DPU 150 may be communicatively coupled to a data center fabric (e.g., switch fabric 14), one or more server devices (e.g., servers 12), storage media (e.g., SSDs), one or more network devices, random access memory, or the like, e.g., via PCI-e, Ethernet (wired or wireless), or other such communication media in order to interconnect each of these various elements. DPU 150 generally represents a hardware chip implemented in digital logic circuitry. As various examples, DPU 150 may be provided as an integrated circuit mounted on a motherboard of a computing, networking and/or storage device or installed on a card connected to the motherboard of the device.

In general, DPU 150 represents a high performance, hyper-converged network, storage, and data processor and input/output hub. As illustrated in FIG. 3, DPU 150 includes networking unit 152, processing clusters 156A-1 to 156N-M (processing clusters 156), host units 154A-1 to 154B-M (host units 154), and central cluster 158, and is coupled to external memory 170. Each of host units 154, processing clusters 156, central cluster 158, and networking unit 152 may include a plurality of processing cores, e.g., MIPS cores, ARM cores, PowerPC cores, RISC-V cores, or CISC or x86 cores. External memory 170 may comprise random access memory (RAM) or dynamic random access memory (DRAM).

As shown in FIG. 3, host units 154, processing clusters 156, central cluster 158, networking unit 152, and external memory 170 are communicatively interconnected via one or more specialized network-on-chip fabrics. A set of direct links 162 (represented as dashed lines in FIG. 3) forms a signaling network fabric that directly connects central cluster 158 to each of the other components of DPU 150, that is, host units 154, processing clusters 156, networking unit 152, and external memory 170. A set of grid links 160 (represented as solid lines in FIG. 3) forms a data network fabric that connects neighboring components (including host units 154, processing clusters 156, networking unit 152, and external memory 170) to each other in a two-dimensional grid.

Networking unit 152 has Ethernet interfaces 164 to connect to the switch fabric, and interfaces to the data network formed by grid links 160 and the signaling network formed by direct links 162. Networking unit 152 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 152, which are coupled to respective grid links 160. The DMA engines of networking unit 152 are configured to fetch packet data for transmission. The packet data may be in on-chip or off-chip buffer memory (e.g., within buffer memory of one of processing clusters 156 or external memory 170), or in host memory.

Host units 154 each have PCI-e interfaces 166 to connect to servers and/or storage devices, such as SSD devices. This allows DPU 150 to operate as an endpoint or as a root. For example, DPU 150 may connect to a host system (e.g., a server) as an endpoint device, and DPU 150 may connect as a root to endpoint devices (e.g., SSD devices). Each of host units 154 may also include a respective hardware DMA engine (not shown). Each DMA engine is configured to fetch data and buffer descriptors from host memory, and to deliver data and completions to host memory.

DPU 150 provides optimizations for stream processing. DPU 150 executes an operating system that facilitates run-to-completion processing, which may eliminate interrupts, thread scheduling, cache thrashing, and associated costs. For example, an operating system may run on one or more of processing clusters 156. Central cluster 158 may be configured differently from processing clusters 156, which may be referred to as stream processing clusters. In one example, central cluster 158 executes the operating system kernel (e.g., Linux kernel) as a control plane. Processing clusters 156 may function in run-to-completion thread mode of a data plane software stack of the operating system. That is, processing clusters 156 may operate in a tight loop fed by work unit queues associated with each processing core in a cooperative multi-tasking fashion.

DPU 150 operates on work units (WUs) that associate a buffer with an instruction stream to reduce dispatching overhead and allow processing by reference to minimize data movement and copy. The stream-processing model may structure access by multiple processors (e.g., processing clusters 156) to the same data and resources, avoid simultaneous sharing, and therefore, reduce contention. A processor may relinquish control of data referenced by a work unit as the work unit is passed to the next processor in line. Central cluster 158 may include a central dispatch unit responsible for work unit queuing and flow control, work unit and completion notification dispatch, and load balancing and processor selection from among processing cores of processing clusters 156 and/or central cluster 158.

As described above, work units are sets of data exchanged between processing clusters 156, networking unit 152, host units 154, central cluster 158, and external memory 170. Each work unit may be represented by a fixed length data structure, or message, including an action value and one or more arguments. In one example, a work unit message includes four words, a first word having a value representing an action value and three additional words each representing an argument. The action value may be considered a work unit message header containing information necessary for message delivery and information used for work unit execution, such as a work unit handler identifier, and source and destination identifiers of the work unit. The other arguments of the work unit data structure may include a frame argument having a value acting as a pointer to a continuation work unit to invoke a subsequent work unit handler, a flow argument having a value acting as a pointer to state that is relevant to the work unit handler, and a packet argument having a value acting as a packet pointer for packet and/or block processing handlers.

In some examples, one or more processing cores of processing clusters 180 may be configured to execute program instructions using a work unit (WU) stack. In general, a work unit (WU) stack is a data structure to help manage event driven, run-to-completion programming model of an operating system typically executed by processing clusters 156 of DPU 150, as further described in U.S. Patent Application Ser. No. 62/589,427, filed Nov. 21, 2017, the entire content of which is incorporated herein by reference.

As described herein, in some example implementations, load store units within processing clusters 156 may, concurrent with execution of work units by cores within the processing clusters, identify work units that are enqueued in WU queues for future processing by the cores. In some examples, WU queues storing work units enqueued for processing by the cores within processing clusters 156 may be maintained as hardware queues centrally managed by central cluster 158. In such examples, load store units may interact with central cluster 158 to identify future work units to be executed by the cores within the processing clusters. The load store units prefetch, from the non-coherent memory portion of external memory 170, data associated with the future work units. For each core within processing clusters 156, the load store units of the core may store the prefetched data associated with the WU to be processed by the core into a standby segment of the level 1 cache associated with the processing core.

Figure 4:
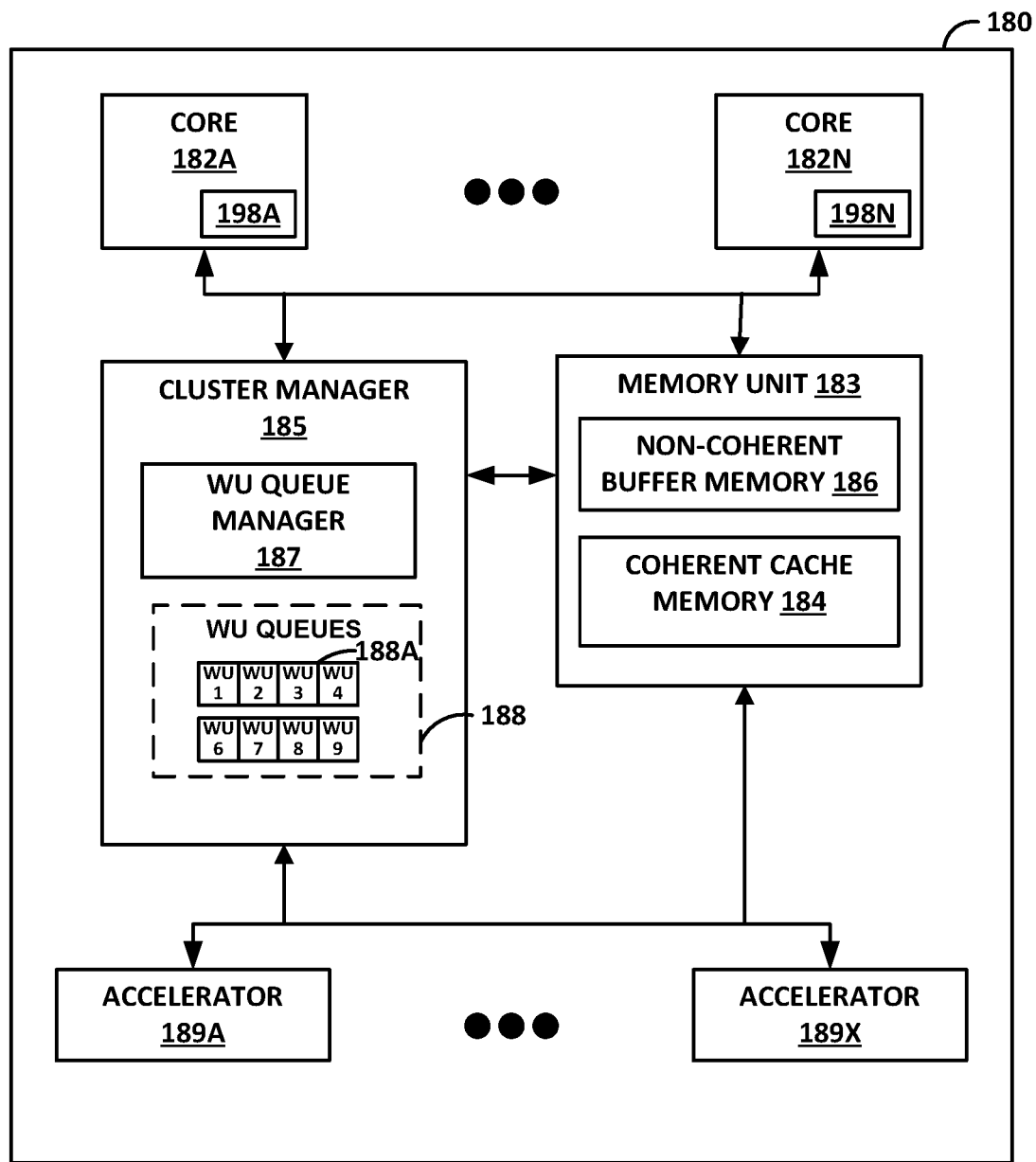
FIG. 4 is a block diagram illustrating an example processing cluster including a plurality of programmable processing cores.

FIG. 4 is a block diagram illustrating another example processing cluster 180 including a plurality of programmable processing cores 182A-182N. Each of processing clusters 156 of DPU 150 of FIG. 3 may be configured in a manner substantially similar to that shown in FIG. 4. In the example of FIG. 4, processing cluster 180 includes cores 182A-182N ("cores 182"), a memory unit 183 including a coherent cache memory 184 and a non-coherent buffer memory 186, a cluster manager 185 including WU queue manager 187 for maintaining (e.g., within hardware registers of processing cluster 180) and manipulating WU queues 188, and accelerators 189A-189X ("accelerators 189"). Each of cores 182 includes L1 buffer cache 198 (i.e., core 182 includes L1 buffer cache 198A and in general, core 182N includes L1 buffer cache 198N). In some examples, cluster manager 185 is alternatively located within central cluster 158, and/or WU queues 188 are alternatively maintained within central cluster 158 (e.g., within hardware registers of central cluster 158).

An access node or DPU (such as access nodes 17 of FIG. 1, DPU 130 of FIG. 2, or DPU 150 of FIG. 3) may support two distinct memory systems: a coherent memory system and a non-coherent buffer memory system. In the example of FIG. 4, coherent cache memory 184 represents part of the coherent memory system while non-coherent buffer memory 186 represents part of the non-coherent buffer memory system. Cores 182 may represent the processing cores discussed with respect to DPU 150 of FIG. 3. Cores 182 may share non-coherent buffer memory 186. As one example, cores 182 may use non-coherent buffer memory 186 for sharing streaming data, such as network packets.

In general, accelerators 189 perform acceleration for various data-processing functions, such as table lookups, matrix multiplication, cryptography, compression, regular expressions, or the like. That is, accelerators 189 may comprise hardware implementations of lookup engines, matrix multipliers, cryptographic engines, compression engines, regular expression interpreters, or the like. For example, accelerators 189 may include a lookup engine that performs hash table lookups in hardware to provide a high lookup rate. The lookup engine may be invoked through work units from external interfaces and virtual processors of cores 182, and generates lookup notifications through work units. Accelerators 189 may also include one or more cryptographic units to support various cryptographic processes. Accelerators 189 may also include one or more compression units to perform compression and/or decompression.

An example process by which a processing cluster 180 processes a work unit is described here. Initially, cluster manager 185 of processing cluster 180 may queue a work unit (WU) in a hardware queue of WU queues 188. When cluster manager 185 "pops" the work unit from the hardware queue of WU queues 188, cluster manager 185 delivers the work unit to one of accelerators 189, e.g., a lookup engine. The accelerator 189 to which the work unit is delivered processes the work unit and determines that the work unit is to be delivered to one of cores 182 (in particular, core 182A, in this example) of processing cluster 180. Thus, the one of accelerators 189 forwards the work unit to a local switch of the signaling network on the DPU, which forwards the work unit to be queued in a virtual processor queue of WU queues 188.

As noted above, in accordance with the techniques of this disclosure, one or more of accelerators 189 may be configured to evaluate regular expressions. A RegEx accelerator of accelerators 189, in accordance with the techniques of this disclosure, may include a hardware-implemented DFA engine that executes one or more DFAs constructed according to target regular expressions, i.e., regular expressions to be evaluated as part of a service. That is, the DFA engine of a RegEx accelerator walks one or more DFA graphs to, effectively, compare an input search string to one or more regular expressions, to which the DFA graphs correspond, to determine whether the input search string matches any of the regular expression, as discussed in greater detail below.

After cluster manager 185 pops the work unit from the virtual processor queue of WU queues 188, cluster manager 185 delivers the work unit via a core interface to core 182A, in this example. An interface unit of core 182A then delivers the work unit to one of the virtual processors of core 182A.

Core 182A processes the work unit, which may involve accessing data, such as a network packet or storage packet, in non-coherent memory 156A and/or external memory 170. Core 182A may first look for the corresponding data in cache 198A, and in the event of a cache miss, may access the data from non-coherent memory 156A and/or external memory 170. In some examples, while processing the work unit, core 182A may store information (i.e., the network packet or data packet) associated with the work unit in an active segment of cache 198A. Further, core 182A may, while processing the work unit, prefetch data associated with a second work unit into a different, standby segment of cache 198A. When core 182A completes processing of the work unit, core 182A initiates (or causes initiation of) a cache flush for the active segment, and may also initiate prefetching of data associated with a third work unit (to be processed later) into that active segment. Core 182A (or a virtual processor within core 182A) may then swap the active segment and the standby segment so that the previous standby segment becomes the active segment for processing of the next work unit (i.e., the second work unit). Because data associated with the second work unit was prefetched into this now active segment, core 182A (or a virtual processor within core 182A) may be able to more efficiently process the second work unit. Core 182A then outputs corresponding results (possibly including one or more work unit messages) from performance of the work unit back through the interface unit of core 182A.

As described herein, in some example implementations, load store units within memory unit 183 may, concurrent with execution of work units by cores 182 within the processing cluster 180, identify work units that are enqueued in WU queues 188 for future processing by the cores. The load store units prefetch, from a non-coherent memory portion of external memory 170, data associated with the future work units and store the prefetched data associated with the WUs to be processed by the cores into a standby segment of the level 1 cache associated with the particular processing cores.

Figure 5:
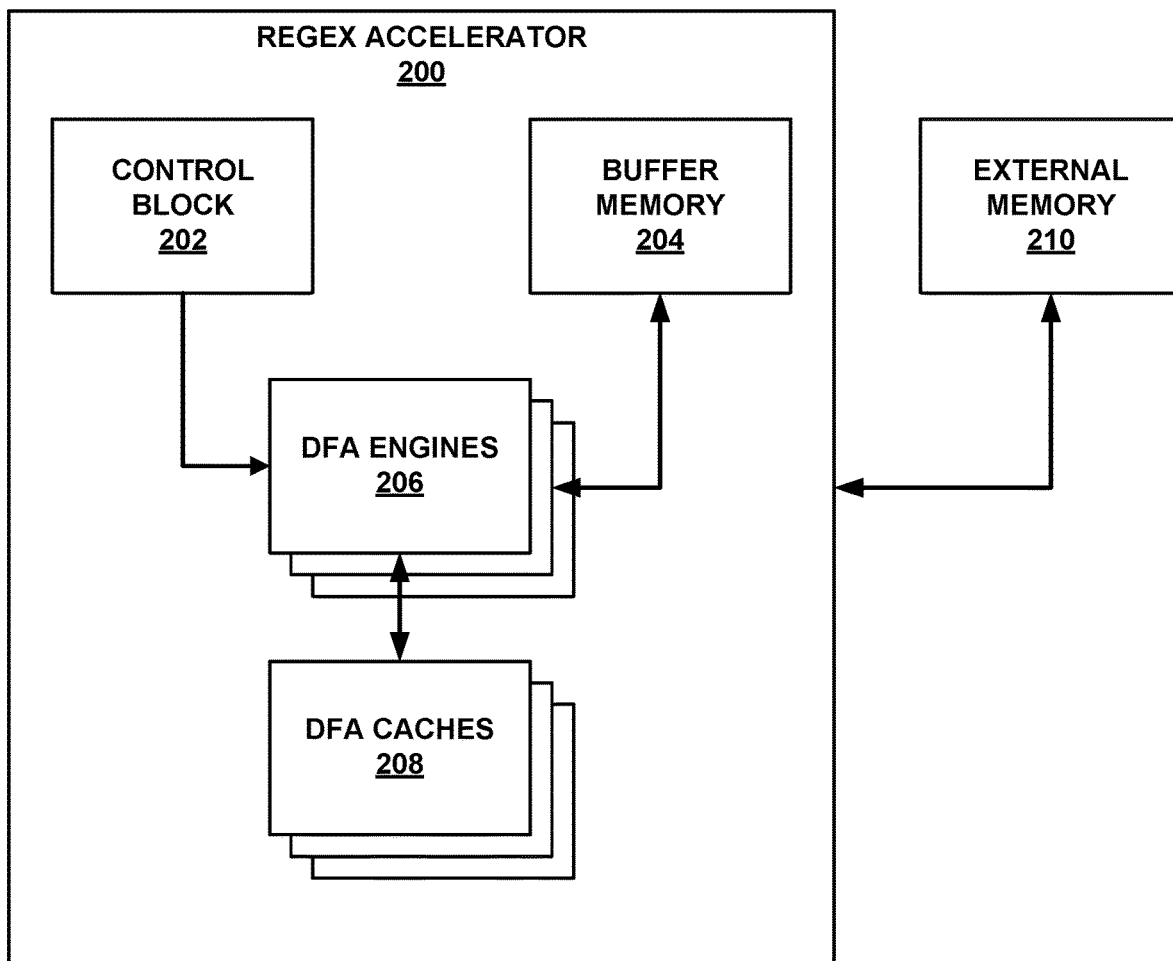
FIG. 5 is a block diagram illustrating an example regular expression (RegEx) accelerator, in accordance with the techniques of this disclosure.

FIG. 5 is a block diagram illustrating an example regular expression (RegEx) accelerator 200, in accordance with the techniques of this disclosure. RegEx accelerator 200 may correspond to one of accelerators 146 of FIG. 2 or one of accelerators 189 of FIG. 4. In this example, RegEx accelerator 200 includes control block 202, on-chip memory dedicated for RegEx accelerator 200, referred to as buffer memory 204, deterministic finite automata (DFA) engines 206, and DFA caches 208, which operates as high-speed on-chip cache memory for caching select DFA arcs. As shown in FIG. 5, RegEx accelerator 200 is also in communication with external memory 210. External memory 210 is so named because external memory 210 is external to RegEx accelerator 200, i.e., off chip, and generally has longer memory access cycles. For example, external memory 210 may correspond to memory unit 134 of FIG. 2 (e.g., non-coherent buffer memory 138 of FIG. 2), external memory 170 of FIG. 3, or non-coherent buffer memory 186 of FIG. 4.

In general, control block 202 represents a processing unit (implemented in circuitry) that controls operation of other components of RegEx accelerator 200. For example, control block 202 may receive work units from external components (such as processing cores) to traverse a DFA (representing a regular expression) for target input data (e.g., a payload of a packet). In particular, one or more cores of a processing cluster, such as cores 182 of processing cluster 180 in FIG. 4, issue an instruction to load, and control block 202 loads, a DFA graph (or in some cases, multiple DFA graphs) that was previously compiled from a corresponding regular expression by a compiler. In this way, each DFA graph generated by the compiler corresponds to at least a portion of a regular expression and is a data structure represents the pattern and/or rule matching criteria set forth within the regular expression. As described in further detail below, after a compiler compiles regular expressions into DFA graphs, a loader may allocate data for the DFA graph to on-chip buffer memory 204 and/or external memory 210, and may optimize the structure of the data based on the particular memory to which the data will be stored when used for stream processing. In some examples, the loader allocates data for nodes of the DFA graph by traversing the DFA graph in a breadth-first manner starting from a root of the DFA graph so as to allocate the nodes of the DFA that are closer to the root first to buffer memory 204 and then to external memory 210 once buffer memory 204 is full or a pre-determined amount of buffer memory 204 will be utilized by the portion of the DFA graph allocated to the buffer memory.

After compilation, the loader stores data representing the DFA graph initially in external memory 210 or a different computer-readable storage medium for loading when needed for stream processing. In some examples, control block 202 may receive work units including instructions to retrieve at least a portion of a DFA graph from external memory 210 allocated and structurally arranged for buffer memory 204 by the loader following compilation of the regular expression. In response, control block 202 may retrieve the designated portion of the DFA graph from external memory 210 and store the portion of the DFA graph to one or more of buffer memory 204, and in some cases may preload certain nodes into high-speed, on-chip DFA caches 208, which may operate as L1 caches. Likewise, after one or more searches have been conducted, control block 202 may receive work units including instructions to clear one or more of DFA caches 208 and/or unload portions of DFAs from buffer memory 204. Furthermore, control block 202 may receive work units including instructions to initiate a search, e.g., indicating a payload to be searched using a loaded DFA graph. In some examples, a single work unit may represent both a command to load a DFA and to perform a search using the loaded DFA.

In general, a DFA graph includes a set of nodes directly linked by arcs, where each node in the graph represents a state and each arch represents transitions between states based on criteria specified for the respective arc. Each node of a DFA graph may contain one or more arcs directionally linking the node to itself and/or other nodes within the DFA graph.

As further described below, when compiling one or more regular expressions into one or more DFA graphs, the compiler may generate one or more of the nodes in a form of a hash table having a set of hash buckets for storing data indicative of the state transitions represented by the arcs originating from the node. Input, such as symbols within payloads of stream data, are hashed to hash buckets to determine whether the input results in a state transition for the given node. Moreover, the compiler may arrange each hash bucket in the form of a set of slots, and data representative of the arcs of the DFA may be stored in the slots of hash buckets. Further, when generating the DFA graph, the compiler may control and arrange the number of slots each hash bucket for a given node based on the target memory designated to store the node when the DFA graph is to be applied. For example, each of buffer memory 204 and external memory 210 are configured so as to allow a certain amount of memory to be read in a single access, generally referred to herein as a memory slice. A memory slice may, for example, represent a certain number of memory-aligned bytes in buffer memory 204 or a certain number of aligned bytes in external memory 210. Moreover, the number of bytes of buffer memory 204 allocated for memory slices may differ from that of external memory 210. In general, memory slices of external memory 210 are larger that memory slices of buffer memory 204, such that buffer memory 204 generally stores fewer bytes for memory slices than external memory 210. In one example, buffer memory 204 stores memory slices having 32 bytes of data and is 32-byte aligned, while external memory 210 stores memory slices having 64 bytes of data and is 64-byte aligned. As further described below, the compiler may construct the format and arrangement of the hash table representing a given node in a DFA graph to optimize the node for memory access based on the target memory to which the node will be allocated when used by RegEx accelerator 200 for stream processing. For example, the compiler may control the number of slots within each row of the hash table (i.e., each hash bucket) so that the row occupies a single or multiple of the memory slice for the memory selected by the compiler for storing the node when the DFA graph is loaded for use, thereby decreasing memory access times when applying the DFA graph for stream processing.

In this way, the compiler allocates a node with more arcs than the number of slots per slice to a power of 2 slices using one or more hash functions, with these nodes being referred to herein as HASH nodes. Labels for arcs from a node of the DFA graph may act as keys to the hash functions, such that DFA engines 206 execute the hash functions on the labels of the arcs. In other words, the hash functions may map the labels for the arcs to respective hash buckets, which may correspond to slots within one or more additional memory slices for a current node of the DFA graph storing, the slots of the additional memory slices storing additional arcs for the current node. Control block 202 or one of DFA engines 206 may locate data for the nodes of the DFA graph using a mode value describing in which way the node is allocated. Thus, control block 202 or one of DFA engines 206 stores retrieves data describing the mode value for a particular node.

In yet another example, the compiler may generate some of the nodes not as hash tables but instead in a more compact form such that the node can be stored within a single memory slice of the memory designated for storage of the node. The compiler, for example, may determine that a node of a DFA graph has fewer arcs than the number of slots per memory slice and may then construct the node so as to occupy a single slice. In some examples, the compiler may allocate the node for storage in the target memory in a manner that overlays the node on unused slots of a memory slice that is designated to store a hash bucket for a hash node. In other words, these nodes (referred to herein as a 'fill node') are constructed and allocated to memory addresses of the targeted memory so as to occupy unused slots of hash buckets of HASH nodes.

In some examples, a first subset of the nodes of a DFA graph may be stored in buffer memory 204 and transition to the remaining nodes of the DFA graph stored in external memory 201. The data representative of the arcs may, in these examples, include a locator value that indicates whether data for a respective subsequent node of the DFA graph (pointed to by the arc) is stored in buffer memory 204 or external memory 210. In this manner, DFA engines 206 may use the locator value to retrieve data for the respective subsequent arc from either buffer memory 204 or external memory 210, and store the retrieved data in, e.g., a respective one of DFA caches 208. In some examples, when the data for the subsequent node is stored in external memory 210, DFA engines 206 may retrieve the data for the subsequent node from external memory 210 and store this retrieved data to buffer memory 204.

Each of DFA engines 206 include one or more hardware threads configured to execute respective search processes according to a DFA graph. Each of the threads may include, for example, one or more respective memories (e.g., registers, caches, or the like) for storing a current node of a corresponding DFA graph and a current position of a payload data being inspected. That is, the threads may store data representing a current node locator and a payload offset. The current node locator may correspond to a value stored by a thread including a memory type (e.g., buffer memory 204 or external memory 210), address, and mode (size and layout) of the current node.

DFA engines 206 also include respective processing units for comparing a current symbol of the payload data to labels for arcs from the current node of the DFA graph. The threads of each of DFA engines 206 may share a common processing unit, or the threads may each include a corresponding processing unit. In general, the processing unit determines a node to which to transition from the current node (i.e., the node to which the arc having a label matching the current symbol of the payload data points). More particularly, given a current node locator and an input byte (i.e., the value of a current symbol of the payload data), the processing unit reads the node from the memory location indicated by the current node locator and determines an arc of the node (if any) having a label that is the same as the input byte. If the processing unit finds such an arc, the processing unit provides the next node locator for the next input byte. On the other hand, if no such arc is found, the processing unit may reinitialize the next node locator to the start node (i.e., a root of the DFA graph).

The processing unit or the thread of the corresponding one of DFA engines 206 may then update the current node locator and the payload offset. The processing unit may continue this evaluation until either the entire set of payload data has been examined without finding a match, or a resulting node of the DFA graph is a matching node. In response to reaching a matching node, the thread of the one of DFA engines 206 may return data indicating that a match has been identified.

In some examples, before evaluating payload data, DFA engines 206 may preload at least a portion of a DFA graph into buffer memory 204 from external memory 210 or a different computer-readable medium based on the memory allocation specified by the compiler for each nodes. Additionally or alternatively, DFA engines 206 may preload a portion of the DFA graph into memory of a thread of the one of DFA engines 206. In particular, DFA engines 206 may be configured to receive a DFA LOAD work unit, including instructions to direct the DFA engine to load at least a portion of a DFA graph (e.g., a root of the DFA graph, and/or other portions of the DFA graph) into buffer memory 204 and/or memory of one of the threads of the DFA engines 206. The at least portion of the DFA graph may include a root node of the DFA graph and/or data representing one or more nodes and/or arcs of the nodes of the DFA graph. Likewise, DFA engines 206 may be configured to unload a loaded portion of a DFA graph from the thread memory and/or from buffer memory 204, e.g., in response to a DFA UNLOAD work unit. The DFA UNLOAD work unit may include instructions indicating that one or more loaded arcs of a DFA graph are to be removed from thread memory and/or buffer memory 204, and/or to unlock and clear a root buffer for a DFA graph from the thread memory and/or buffer memory 204.

To perform a search, DFA engines 206 may receive a DFA SEARCH work unit including instructions to cause DFA engines 206 to select an idle thread of DFA engines 206 to be used to search payload data against a DFA graph, at least a portion of which may have been previously loaded in response to a DFA LOAD work unit. To perform the search, DFA engines 206 may provide to the idle thread: data representing locations of the DFA graph (including a root of the graph, a base address of a portion of the DFA graph loaded into buffer memory 204, and a base address of a portion of the DFA graph in external memory 210), a node from which to start the DFA graph traversal, addresses of payload buffers to be processed in a work unit stack frame, and an address and size of a result buffer in the work unit stack frame.

Accordingly, as discussed above, a thread and a processing unit of one of DFA engines 206 may perform a search in response to a DFA SEARCH work unit. In particular, the processing unit may retrieve a current symbol from payload data of the work unit stack frame, as indicated by the DFA SEARCH work unit, and ultimately output an indication of whether a match occurred to the result buffer in the work unit stack frame.

An example search algorithm is described below. Inputs to the algorithm include a location of a root of a DFA graph (root_node_locator), addresses of the DFA graph in buffer memory 204 and external memory 210, a starting node for the traversal of the DFA graph, payload bytes used to traverse the graph, and an address to which to write matching results. Starting from the first byte in the first payload buffer and the start node locator, a DFA thread of one of DFA engines 206 matches each payload byte (cur_label:=payload [cur_offset]) with an arc to a DFA node (cur_node:= dfa_graph[cur_node_locator]). The example matching algorithm, which may be performed by the processing unit of the one of DFA engines 206, is as follows:

1. If the node at cur_node_locator contains an arc that maps cur_label to a next_node_locator, then:
   a. cur_offset←cur_offset+1
   b. cur_node_locator←next_node_locator
2. If the node at cur_node_locator does NOT contain an arc for cur_label, then:
   a. cur_offset remains the same
   b. cur_node_locator←root_node_locator.

After step 2 above, the processing unit matches the current payload byte to the arcs from the root node. In some examples, this match may be performed in parallel with another byte of the payload, e.g., if the root is preloaded into one of DFA cache memories 208 associated with the thread.

The following example algorithm describes one process for writing data to a result buffer. In this example, a DFA thread may add a result entry to the result buffer. If the current node arc has a MATCH attribute indicating that the subsequent node from this arc is a MATCH, the DFA thread adds data representing the current payload offset and next node locator to the result buffer.

The DFA thread may continue to match consecutive payload bytes with successive DFA nodes until either the last payload byte is processed, the result buffer becomes full, or a memory error is detected. Ultimately, DFA engines 206 may generate a return work unit including data indicating that the search has resulted in a match (but not the last match), the search has resulted in a match and it is the last match, that the result buffer is full, or an error code if an error occurred during the search. RegEx accelerator 200 may send the return work unit to the unit that issued the DFA SEARCH work unit.

Each of DFA engines 206 correspond to respective, private DFA cache memories 208. DFA cache memories 208 may serve two purposes: cache arc data (e.g., recently traversed arcs from a node for which data is stored in external memory 210), and cache root buffer data (e.g., caching pre-loaded root data from external memory 210 for parallel lookups in response to arc cache misses). An entire one of DFA cache memories 208 may be used as an arc cache, where each cache line holds one node arc. DFA engines 206 may load these node arcs and evict these node arcs dynamically in the arc cache when they are accessed and traversed by a respective DFA thread.

In addition, DFA engines 206 may use part of the respective one of DFA cache memories 208 as a software-managed root buffer, where each cache line may hold two preloaded root arcs. If a DFA graph has its root data in external memory 210, DFA engines 206 may first need to receive a DFA LOAD work unit to preload the root arcs into the root buffer before performing a search using the DFA graph. Eventually, DFA engines 206 may also need to receive a DFA UNLOAD work unit to unload the DFA arcs, once the DFA graph is no longer in use.

Figure 6A:
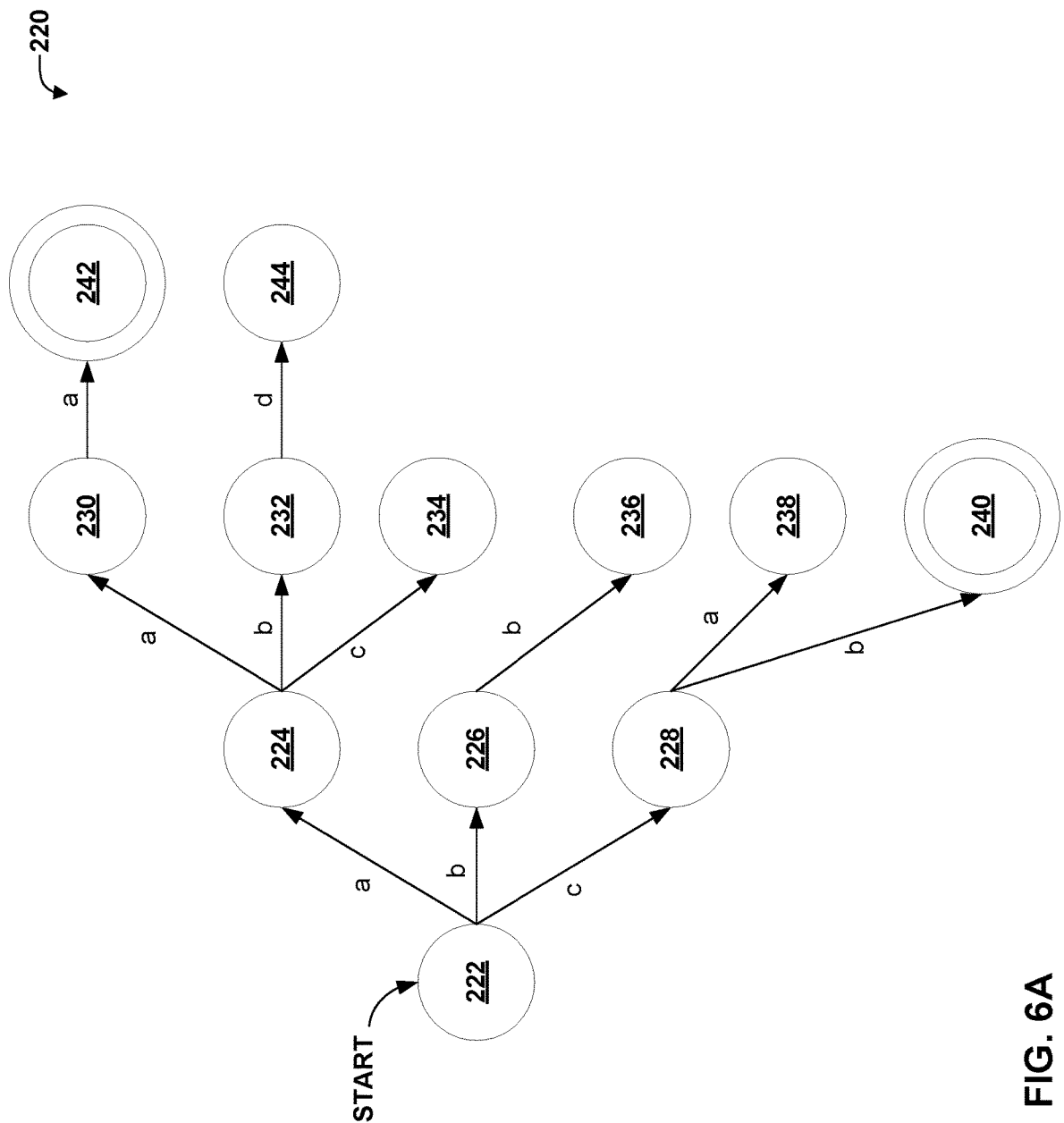
FIG. 6A is a conceptual diagram illustrating an example deterministic finite automata (DFA) graph.

FIG. 6A is a conceptual diagram illustrating an example DFA graph 220. As noted above, a DFA graph represents a set of one or more corresponding regular expressions. That is, as noted above, a compiler generates the DFA graph from the corresponding one or more regular expressions. In general, DFA graphs include nodes (representing states) with arcs (directed links representing transitions) pointing from one node to another. In the example of FIG. 6A, DFA graph 220 includes nodes 222-244, with arcs having labels between the various nodes. For example, node 222 has an arc to node 224 with label 'a.' As another example, node 224 has an arc to node 232 with label 'b.' Furthermore, node 222 of DFA graph 220 represents a start node, as indicated by the label "START." Likewise, nodes 240, 242, and 244 of DFA graph 220 represent example match nodes that match a corresponding regular expression. In the example of FIG. 6A, strings "aaa", "abd", and "cb" result in matches.

Although not shown in this example, other terminal and non-matching nodes (e.g., nodes 244, 234, 236, and 238) may have arcs pointing back to node 222. Alternatively, no such arcs may be needed, but instead, a processing unit of a DFA engine may be configured to transition to node 222 if no matching arc can be found for a given input byte from a current node. For example, if at node 232, an input value of 'a' is evaluated, the processing unit may transition back to node 222. Furthermore, various arcs may be included that interconnect the nodes of DFA graph 220. For example, node 226 may include an arc that points to node 224.

Figure 6B:
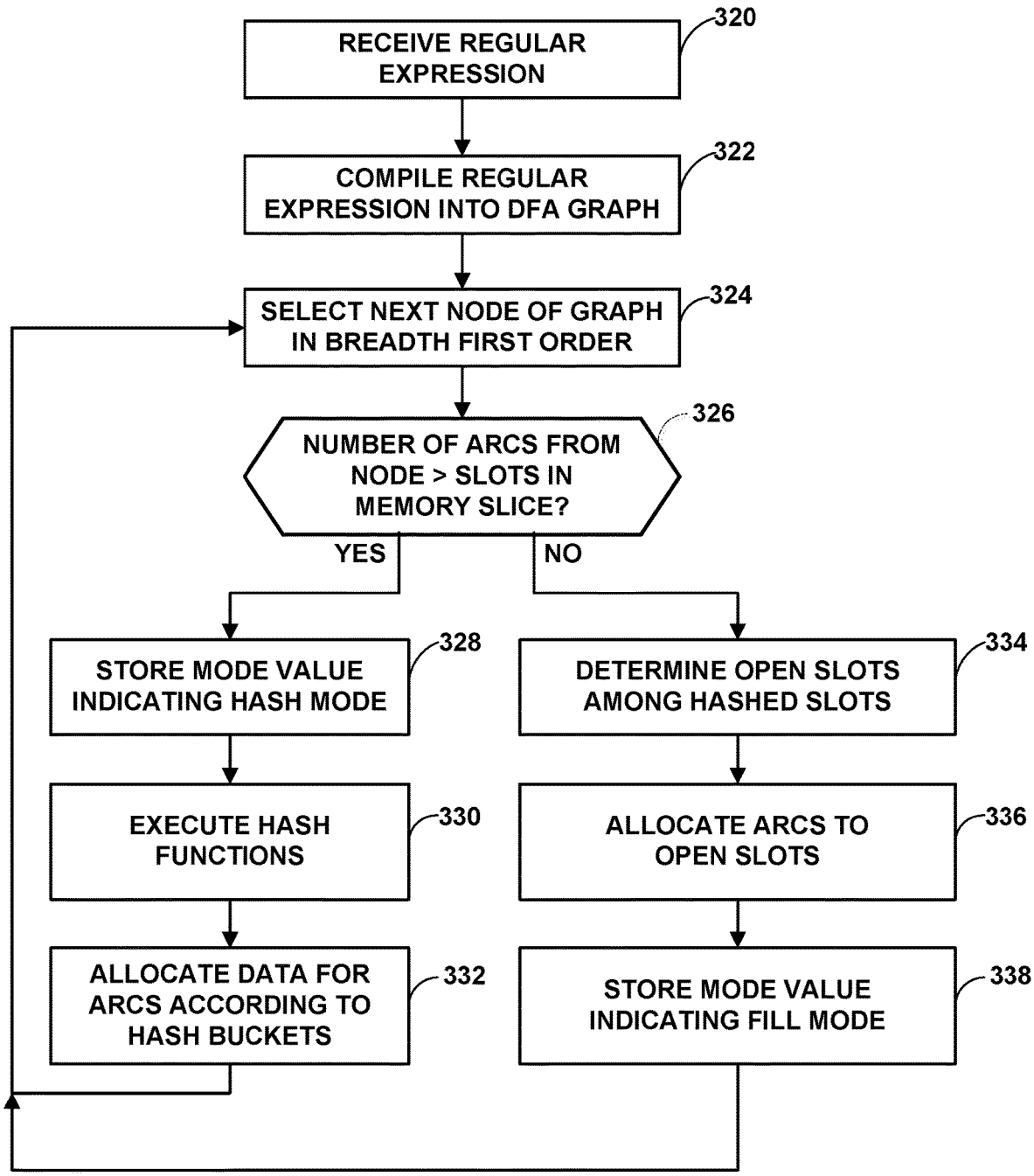
FIG. 6B is a flowchart illustrating an example method for allocating data for nodes of a DFA graph between buffer memory and external memory of a RegEx accelerator, in accordance with the techniques of this disclosure.

FIG. 6B is a flowchart illustrating an example method for allocating data representing nodes of a DFA graph between buffer memory 204 and external memory 210 of RegEx accelerator 200 of FIG. 5 and generating the data based on the allocation to optimize or otherwise improve memory access and utilization, in accordance with the techniques of this disclosure. The method of FIG. 6B is described as being performed by a compiler and a loader executed by one or more processing cores 182 of processing cluster 180 of FIG. 4.

Initially, the compiler receives a set of one or more regular expressions (320). The compiler compiles the regular expression into a DFA graph (322), such as DFA graph 220 of FIG. 6A.

The loader then allocates data for the nodes and arcs to slots of memory slices in buffer memory 204 and/or external memory 210, including assigning the base memory address for the node and specifying the slots to be used to store the arc data for the node. Moreover, based on the number of arcs, the loader determines whether the data representing the node will be arranged as HASH node have a plurality of hash buckets or as a FILL node occupying a portion of a single memory slice. In general, when constructing and allocating the nodes to memory by selecting the base address for each node, the loader traverses the DFA graph and allocates the larger HASH nodes first and then allocates the FILL nodes to occupy unused slots within the hash buckets of the HASH nodes. The loader allocates the data for the nodes and arcs to buffer memory 204 until buffer memory 204 is full, and then transitions the allocation to external memory 210. As noted above, buffer memory 204 and external memory 210 may have memory slices of different sizes, e.g., 32 bytes and 64 bytes, respectively, and the loader generates and structures the HASH nodes and, in particular, the size of the hash buckets, based on the particular memory to which the node is being allocated.

During the process, the loader selects a next node (e.g., initially, the start or root node) of the DFA graph and traverses the graph in breadth first order so nodes closer to the root tend to be allocated to on-chip buffer memory (324). For each node, the loader determines whether the number of arcs from the node is greater than the number of slots in a memory slice of the current memory (buffer memory 204 or external memory 210) and controls the structure of the node based on the number of arcs and the current memory to which the node is to be allocated (326).

If the number of arcs is greater than the number of slots in a memory slice ("YES" branch of 326), the loader generates the data representing the node as a hash table and stores a mode value for the current node indicating that arcs for the current node are stored in hash buckets according to one or more hash functions (328). Furthermore, the loader executes one or more hash functions (e.g., four hash functions) to determine the hash buckets to which to allocate arc data, where the size of the buckets are controlled to have a specific number of slots such that each hash bucket occupies a single or multiple of a memory slice (330). The loader then allocates data for the arcs of the current node to the resulting hash buckets (332).

On the other hand, if the number of arcs is not greater (i.e., less than or equal to) the number of slots in a memory slice ("NO" branch of 326), the loader generates the data representing the node in the form of a FILL node by determining open slots among previously allocated HASH node (334) to which to allocate arc data for the current node. That is, the loader determines a memory slice that may include a number of previously filled slots for a previous hash node, but also at least enough unallocated slots to store data for arcs of the current node. The loader then allocates the arcs of the current node to the open slots of the memory slice (336). The loader then stores a mode value indicating that the current node is allocated as a FILL node, as well as positions for arcs of the current node (338).

Tables 1 and 2 below provide examples of different fill modes for a DFA graph node, depending on whether the arcs for the node are allocated to buffer memory 204 or external memory 210. In particular, Table 1 represents an example set of fill modes for buffer memory 204 (assuming six slots per 32-byte slice of buffer memory 204), while Table 2 represents an example set of fill modes for external memory 210 (assuming ten slots per 64-byte slice of external memory 210). In Tables 1 and 2, X's represent slots to which arc data is allocated for a mode indicated by the mode value.

TABLE 1

| MODE | SLOT NUMBERS | | | | | |
|---|---|---|---|---|---|---|
| | 5 | 4 | 3 | 2 | 1 | 0 |
| 1 | | | | | | X |
| 2 | | | | | X | |
| 3 | | | | X | | |
| 4 | | | X | | | |
| 5 | X | X | | | | |
| 6 | | | X | X | | |
| 7 | | | | | X | X |
| 8 | | | X | X | X | |
| 9 | X | X | X | | | |
| 10 | X | X | | | | X |
| 11 | X | X | | X | X | |
| 12 | | | X | X | X | X |
| 13 | X | X | X | X | X | |
| 14 | X | X | X | X | X | X |

TABLE 2

| MODE | SLOT NUMBERS | | | | | | | | | |
|---|---|---|---|---|---|---|---|---|---|---|
| | 9 | 8 | 7 | 6 | 5 | 4 | 3 | 2 | 1 | 0 |
| 1 | | | | | | | | | | X |
| 2 | | | | | | | | | X | |
| 3 | | | | | | | | X | | |
| 4 | | | | | | | X | | | |
| 5 | | | | | | X | | | | |
| 6 | | | | | X | | | | | |
| 7 | | | | | | | X | X | | |
| 8 | | | | | | | | X | X | |
| 9 | | | | | | | | | X | X |
| 10 | X | X | | | | | | | | |
| 11 | | | X | X | | | | | | |
| 12 | | | | X | X | | | | | |
| 13 | | | | | X | | | | | X |
| 14 | | | | | X | | | | X | |

TABLE 2-continued

| | SLOT NUMBERS | | | | | | | | | |
|---|---|---|---|---|---|---|---|---|---|---|
| MODE | 9 | 8 | 7 | 6 | 5 | 4 | 3 | 2 | 1 | 0 |
| 15 | | | | | X | | | X | | |
| 16 | | | | | | X | X | X | | |
| 17 | | | | | | | | X | X | X |
| 18 | X | X | X | | | | | | | |
| 19 | | | X | X | X | | | | | |
| 20 | | | | X | X | | | | | X |
| 21 | | | | | | X | X | X | X | |
| 22 | X | X | X | X | | | | | | |
| 23 | | | | | X | X | X | X | X | |
| 24 | X | X | X | X | X | | | | | |
| 25 | X | X | X | X | X | | | | X | |
| 26 | X | X | X | X | X | X | X | | | |
| 27 | X | X | X | X | X | X | X | | X | |
| 28 | X | X | X | X | X | X | X | X | X | |
| 29 | X | X | X | X | X | X | X | X | X | X |

After allocating the arc data for the node according as either a HASH node or a FILL node as discussed above, the loader moves to the next node of the DFA graph (in breadth first order) (324) and proceeds to allocate the data for that node, until data for arcs of all nodes has been allocated. As noted above, in some examples, the loader traverses the DFA graph in breath-first manner and allocates HASH nodes during the traversal while setting aside FILL nodes for subsequent allocation within the unused slots of the HASH nodes. It should be understood that "allocated" refers to determining the bases addresses where the nodes and arc data are to be subsequently loaded and stored including whether the data for the arcs of the node is to be stored in external memory 210 or read into buffer memory 204, e.g., in response to a DFA LOAD WU. The loader may store such data to external memory 210 or other computer-readable medium.

Figure 6C:
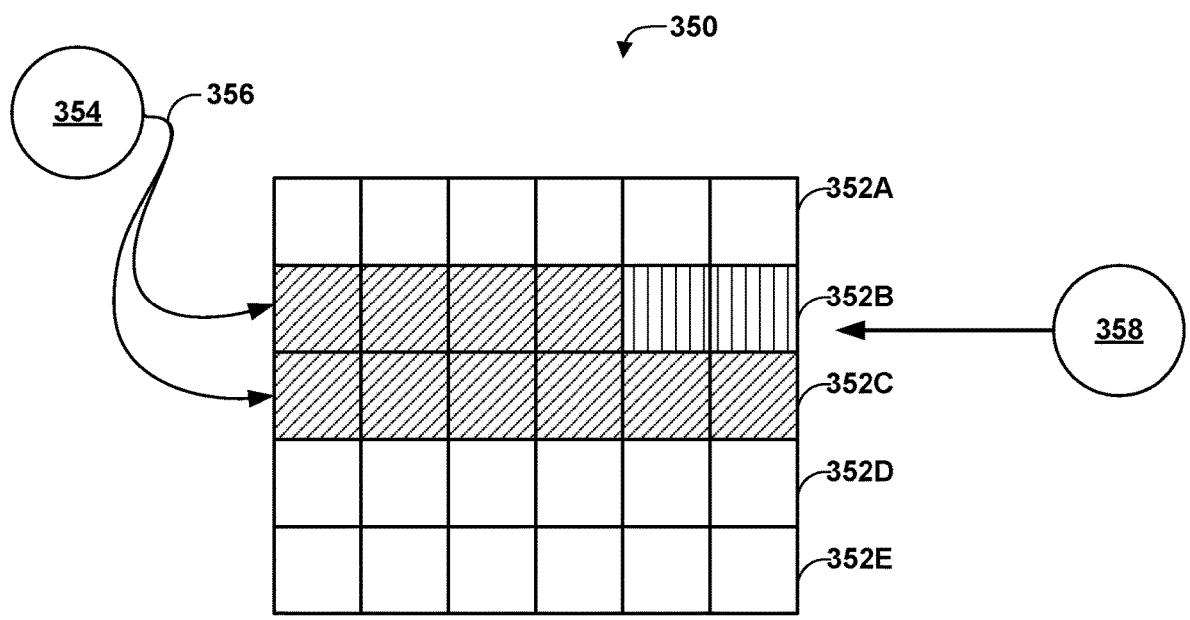
FIG. 6C is a conceptual diagram illustrating an example set of memory slices of a buffer memory, including data for arcs of nodes of a DFA graph.

FIG. 6C is a conceptual diagram illustrating an example set of memory slices 350 of buffer memory 204. In particular, the example set of memory slices 350 includes memory slices 352A-352E (memory slices 352). In this example, each of memory slices 352 includes six slots, although it should be understood that in other examples, other numbers of slots may be used. Moreover, although discussed with respect to the particular example of buffer memory 304 having 32-byte memory slices with six slots, similar techniques may apply to memory slices of external memory 310, which may be 64 byte memory slices with ten slots.

FIG. 6C also depicts an example node 354 of a DFA graph. In this example, arcs for node 354 is generated by the compiler to be stored in hash mode, such that node 354 may be viewed as a HASH node having a number of hash buckets mapped to respective memory slices 352. That is, the compiler selects and utilizes hash function 356 to map label data for node 354 to memory slice 352B, and utilizes hash function 356 to map the label data for node 354 to memory slice 352C. Data for arcs of node 354 is stored in slots of memory slices 352B, 352C as represented by diagonal hashing. As seen in this example, arc data of node 354 that hashes to a hash bucket occupying memory slice 352B only utilizes four of the six slots.

FIG. 6C further depicts another example node 358 of the DFA graph. In this example, the compiler has generated the data for representing node 358 as a FILL node, where the arcs for node 358 are stored in fill mode within unused slots of the overall hash table allocated for hash node 354. In particular, with respect to the example of Table 1 above, arcs for node 358 are stored according to fill mode 7 so as to occupy slots 0 and 1 within memory slice 352B of on-chip buffer memory. That is, arc data for node 358 is stored in slots of memory slice 352B, as represented by vertical hashing, which are unused slots of a hash bucket of HASH node 354 mapped to memory slice 352.

In this manner, the compiler or loader may allocate slots of memory slices of, e.g., buffer memory 304, to arcs for nodes of a DFA graph. The compiler may allocate slots of memory slices for external memory 310 in a similar fashion, although with the recognition that the memory slices of external memory 310 may be larger than the memory slices of buffer memory 304.

Figure 7A:
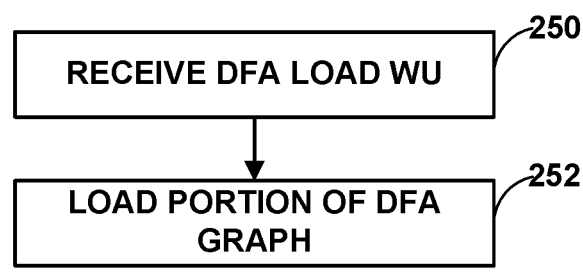
FIGS. 7A through 7C are flowcharts illustrating example regular expression operations performed in accordance with the techniques of this disclosure.
Figure 7B:
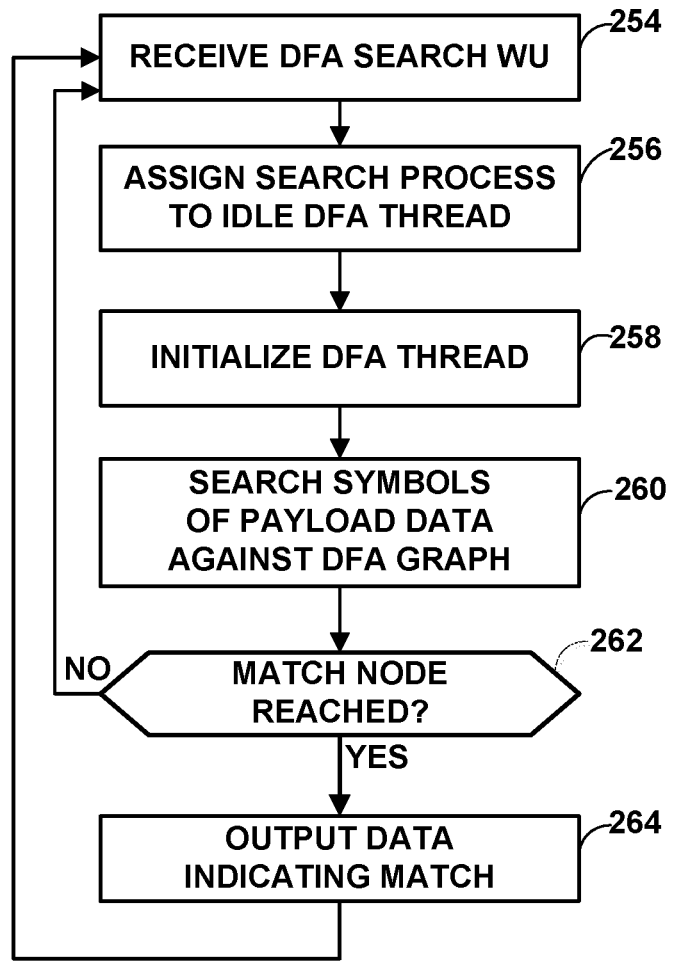
Figure 7C:
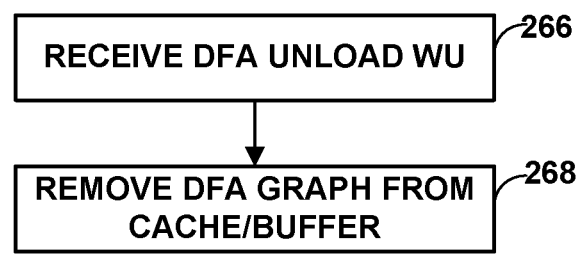

FIGS. 7A through 7C are flowcharts illustrating example regular expression operations performed in accordance with the techniques of this disclosure. The operations of the methods of FIGS. 7A through 7C may be performed by, e.g., the components of RegEx accelerator 200 as discussed below, or other devices in other examples. Furthermore, the operations of the methods of FIGS. 7A through 7C may be performed in a different order or with fewer operations than what is shown in FIGS. 7A through 7C.

As shown in FIG. 7A, initially, RegEx accelerator 200 receives a DFA LOAD work unit (WU) (250). As discussed above, the DFA LOAD work unit may specify a DFA graph to be loaded into, e.g., buffer memory 204 and/or one of DFA caches 208. The DFA LOAD work unit may also specify a portion of the DFA graph to be loaded, e.g., a root node of the DFA graph and/or one or more other nodes and corresponding arcs. In response to the DFA LOAD work unit, control block 202 may cause one of DFA engines 206 to load the indicated portion of the indicated DFA graph (252), e.g., into buffer memory 204 and/or into a corresponding one of DFA caches 208. In this manner, the one of DFA engines 206 stores at least a portion of a DFA graph to a DFA buffer of a memory, the DFA graph comprising a plurality of nodes, each of the nodes having zero or more arcs each including a respective label and pointing to a respective subsequent node of the plurality of nodes, at least one of the plurality of nodes comprising a match node.

Next, as shown in FIG. 7B, after having previously loaded the portion of the DFA graph, RegEx accelerator 200 receives a DFA SEARCH work unit (254). In some examples, RegEx accelerator 200 may receive a single work unit representing both load and search instructions. The DFA SEARCH work unit, as discussed above, specifies payload data to be compared to the DFA graph. In response to receiving the DFA SEARCH work unit, control block 202 directs the work unit to one of DFA engines 206, which assigns the search to an idle hardware thread thereof (256). The one of DFA engines 206 also initializes the DFA thread (258). For example, using data of the DFA SEARCH work unit, the one of DFA engines 206 sets a value of a current node memory for the thread to represent a current node (e.g., a start node) of the DFA graph and a value of a payload offset to represent a current byte of the payload (e.g., a starting symbol of the payload). The one of DFA engines 206 may further maintain data representing a location of a result buffer to which output data is to be written as a result of performing the search.

The DFA thread of the one of DFA engines 206 may then search symbols of the payload data against the DFA graph (260). In particular, the DFA thread may compare (or cause a processing unit of the one of DFA engines 206 to compare) the current symbol of the payload data to labels of arcs from the current node of the DFA graph. If one of the labels is the same as the current symbol, the DFA thread may update the current node value to correspond to the node pointed to by the arc having the label that is the same as the current symbol, and increment the value for the position of the current symbol, to move to a next symbol in the payload data. If none of the labels match the current symbol, the DFA thread may transition back to the start node of the DFA graph, and compare the current symbol to the arcs from the start node of the DFA graph. If the start node has been loaded into one of DFA caches 208, the DFA thread may perform the comparison of the current symbol of the payload data to the arcs from the start node in parallel to the comparisons of the current symbol to the arcs from the current node.

In this manner, the DFA thread determines a value of a current node memory representing a current node of the plurality of nodes in the DFA graph, a value of a payload offset memory representing a position of current symbol in a sequence of symbols of payload data, and a label of one of the arcs of the current node that matches the current symbol. Furthermore, in this manner, the DFA thread updates the value of the current node memory to a value representative of the respective subsequent node of the one of the arcs having the label that matches the current symbol. Likewise, in this manner, the DFA thread increments the value of the payload offset memory.

In some examples, the DFA thread may determine the label of one of the arcs of the current node that matches the current symbol by speculatively accessing a cache of RegEx accelerator 200 by accessing the two or more node representations of the DFA graph that are stored in the cache in parallel. That is, RegEx accelerator 200 may maintain in a memory, a reference node representation for the at least the portion of the DFA graph, and a respective delta node representation for each node of the at least the portion of the DFA graph other than the reference node, each respective delta node representation defining each of the zero or more arcs of a different, corresponding node from the plurality of nodes that is not defined by the representation of the reference node. As such, the DFA thread may determine a label of one of the arcs of the current node that matches the current symbol by speculatively accessing the two or more node representations in parallel to determine whether the current symbol matches the label.

The DFA thread may determine whether a match node of the DFA graph has been reached (262). The DFA thread may encounter zero, one, or more match nodes of the DFA graph, depending on the DFA graph and the payload data. In response to reaching a match node ("YES" branch of 262), the DFA thread may output data indicating that a match has occurred (264). In some examples, the DFA thread outputs data for each match that has occurred. For example, the DFA thread may write data to the result buffer, as discussed above. If no match occurs for the entire payload, in some examples, the DFA thread outputs data indicating that no match has occurred, and that the payload has ended. In this manner, in response to updating the value of the current node memory to correspond to the match node, the DFA thread outputs an indication that the payload data has resulted in a match.

In the example of FIG. 7B, it should be understood that multiple searches may be performed using the same loaded DFA graph. That is, one or more DFA threads may perform multiple searches on multiple different packet payloads using the same DFA graph after the DFA graph has been loaded, without unloading the DFA graph between searches. Furthermore, in the example of FIGS. 7A and 7B, it should be understood that, in some instances, both the load operations of FIG. 7A and the searches operations of FIG. 7B are performed concurrently in response to a single "atomic" search command.

Finally, turning to FIG. 7C, in some instances, after performing the search or after performing multiple searches according to the operations of FIG. 7B, one of the DFA engines 206 receive a DFA UNLOAD work unit (266). In response to the DFA UNLOAD work unit, the one of DFA engines 206 removes the DFA graph data from the corresponding one of DFA caches 208 and/or buffer memory 204 (268). It should be understood that the operations of FIG. 7C are optional and in some instances the DFA engines 206 may never perform the unload operations of FIG. 7C after performing the search or after performing multiple searches.

Figure 8:
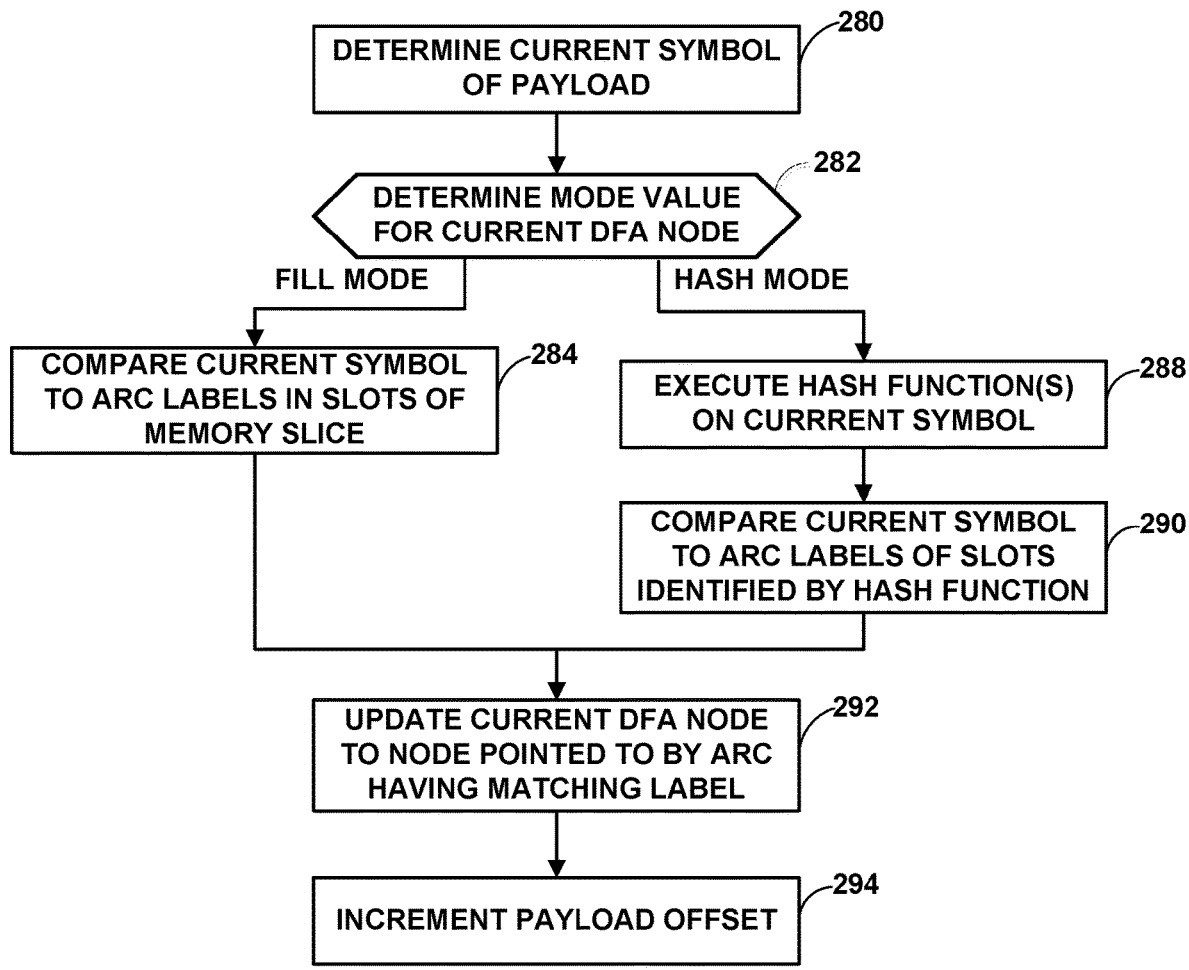
FIG. 8 is a flowchart illustrating an example method for traversing a DFA graph from one node to a next node in accordance with the techniques of this disclosure.

FIG. 8 is a flowchart illustrating an example method for traversing a DFA graph from one node to a next node to apply the DFA graph to stream data in accordance with the techniques of this disclosure. In particular, the flowchart of FIG. 8 represents traversing a DFA graph stored as hash nodes and/or fill nodes in a memory of the RegEx accelerator so as to apply the DFA graph to stream data units, such as packets. The method of FIG. 8 may be performed as part of the method of FIG. 7 discussed above. For example, the method of FIG. 8 may be performed iteratively as part of step 260 of FIG. 7. Again, and for purposes of example, the method of FIG. 8 is explained with respect to the components of RegEx accelerator 200, although other devices may be configured to perform this or a similar method.

Initially, it is assumed that a DFA thread of one of DFA engines 206 stores a value representing a current node of a DFA graph, as well as a current symbol of a payload being evaluated. For example, the DFA thread may maintain a payload offset value representing the position of a current symbol in the payload. Accordingly, the DFA thread determines a current symbol of the payload, i.e., the value (e.g., byte value) at the payload offset within the payload (280).

The DFA thread also determines a mode value for the current node of the DFA graph, i.e., whether the structure of the node and the memory layout and allocation for the node's arc data is a FILL node or a HASH node (282). In general, the mode value may indicate that the current node is either in a fill mode (i.e., all arcs from the current node are stored in a single memory slice) or a hash mode (i.e., one or more arcs from the current node are stored in slots of one or more additional memory slices). In the case that the mode value indicates that the current node is in fill mode ("FILL MODE" branch from 282), the DFA thread compares the current symbol to arc labels of arcs in slots of the memory slice (284).

The DFA thread alternatively compares the current symbol to arc labels of arcs in the slots of the memory slice in the case that the mode value indicates that the current node is in hash mode ("HASH MODE" branch from 282). That is, the DFA thread determines one or more slots of one or more additional memory slices using one or more hash functions (e.g., four hash functions) in this case. In particular, the DFA thread executes the one or more hash functions on the current symbol value (288), and the buckets resulting from execution of the hash functions correspond to slots of the one or more additional memory slices in which additional arc data for the current node is stored. Accordingly, the DFA thread also compares labels of the arc data in the slots of the one or more additional memory slices to the current symbol of the payload (290).

In either case, the DFA thread determines one of the arcs having a label that matches the current symbol of the payload. In response to determine the one of the arcs having the label that matches the current symbol, the DFA thread updates the current node of the DFA graph to the node to which the one of the arcs points (292) and increments the payload offset (294) to update the current symbol of the payload.

Figure 9:
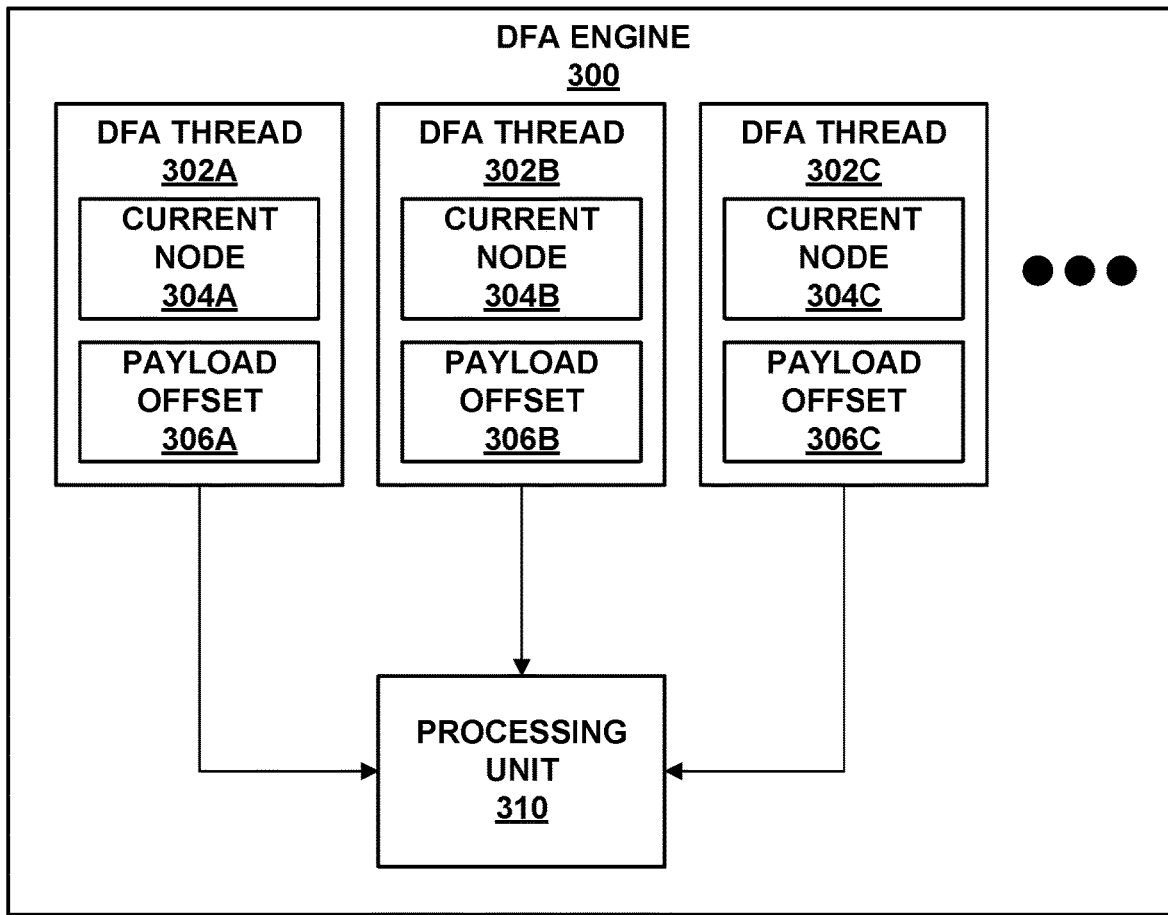
FIG. 9 is a block diagram illustrating an example DFA engine.

FIG. 9 is a block diagram illustrating an example DFA engine 300. DFA engine 300 may correspond to one of DFA engines 206 of FIG. 5. In this example, DFA engine 300 includes hardware DFA threads 302A-302C (DFA threads 302). Each of DFA threads 302 includes respective current node values 304A-304C (current node values 304) and respective payload offsets 306A-306C (payload offsets 306). In addition, DFA engine 300 includes processing unit 310.

As discussed above, DFA threads 302 generally maintain values of respective current nodes 304 and payload offsets 306 for a current search process. DFA thread 302A, for example, may store data representing a current node of a DFA graph as current node 304A, and a position of a current symbol of payload data being compared to the DFA graph as payload offset 306A. DFA thread 302A may then cause processing unit 310 to compare the value of the current symbol indicated by payload offset 306A to labels of arcs of the node represented by current node 304A. If processing unit 310 determines that a label of one of the arcs matches the value of the current symbol, DFA thread 302A may increment payload offset 306A and update the value of current node 304A to a value representing a node pointed to by the arc. On the other hand, if processing unit 310 determines that none of the labels of the arcs matches the value of the current symbol, DFA thread 302A may update the value of current node 304A to a value representing a start node of the DFA graph. If current node 304A correspond to a node of the DFA graph configured as a match node, DFA thread 302A and/or processing unit 310 may output data indicating that match has occurred.

As noted above, DFA engine 300 may be included in RegEx accelerator 200, which may be included in a processing device, such as one of access nodes 17 (FIG. 1), DPU 130 (FIG. 2), or DPU 150 (FIG. 3). Accordingly, these processing devices represent examples of a processing device including a memory including a deterministic finite automata (DFA) buffer configured to store at least a portion of a DFA graph, the DFA graph comprising a plurality of nodes, each of the nodes having zero or more arcs each including a respective label and pointing to a respective subsequent node of the plurality of nodes, at least one of the plurality of nodes comprising a match node. The processing device also includes a DFA engine implemented in circuitry, the DFA engine comprising one or more DFA threads implemented in circuitry, each of the DFA threads comprising a current node memory storing a value representing a current node of the plurality of nodes in the DFA graph, and a payload offset memory storing a value representing a position of current symbol in a sequence of symbols of payload data. The DFA engine further includes a processing unit configured to determine a label of one of the arcs of the current node that matches the current symbol, update the value of the current node memory to a value representative of the respective subsequent node of the one of the arcs having the label that matches the current symbol, and increment the value of the payload offset memory. In response to updating the value of the current node memory to correspond to the match node, the DFA engine is configured to output an indication that the payload data has resulted in a match.

Figure 10A:
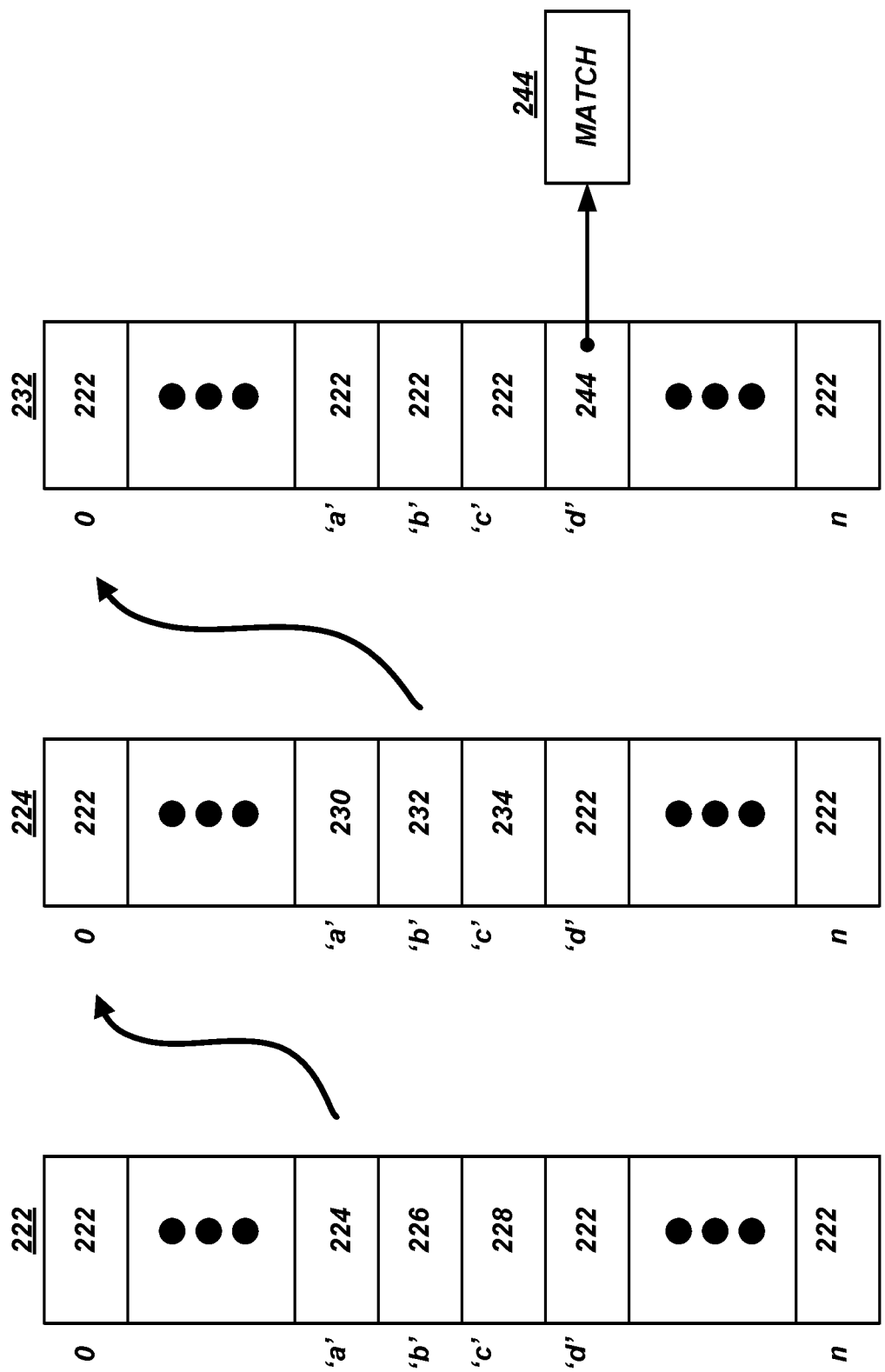
FIGS. 10A and 10B are conceptual diagrams illustrating node representations of a DFA graph, in accordance with the techniques of this disclosure.
Figure 10B:
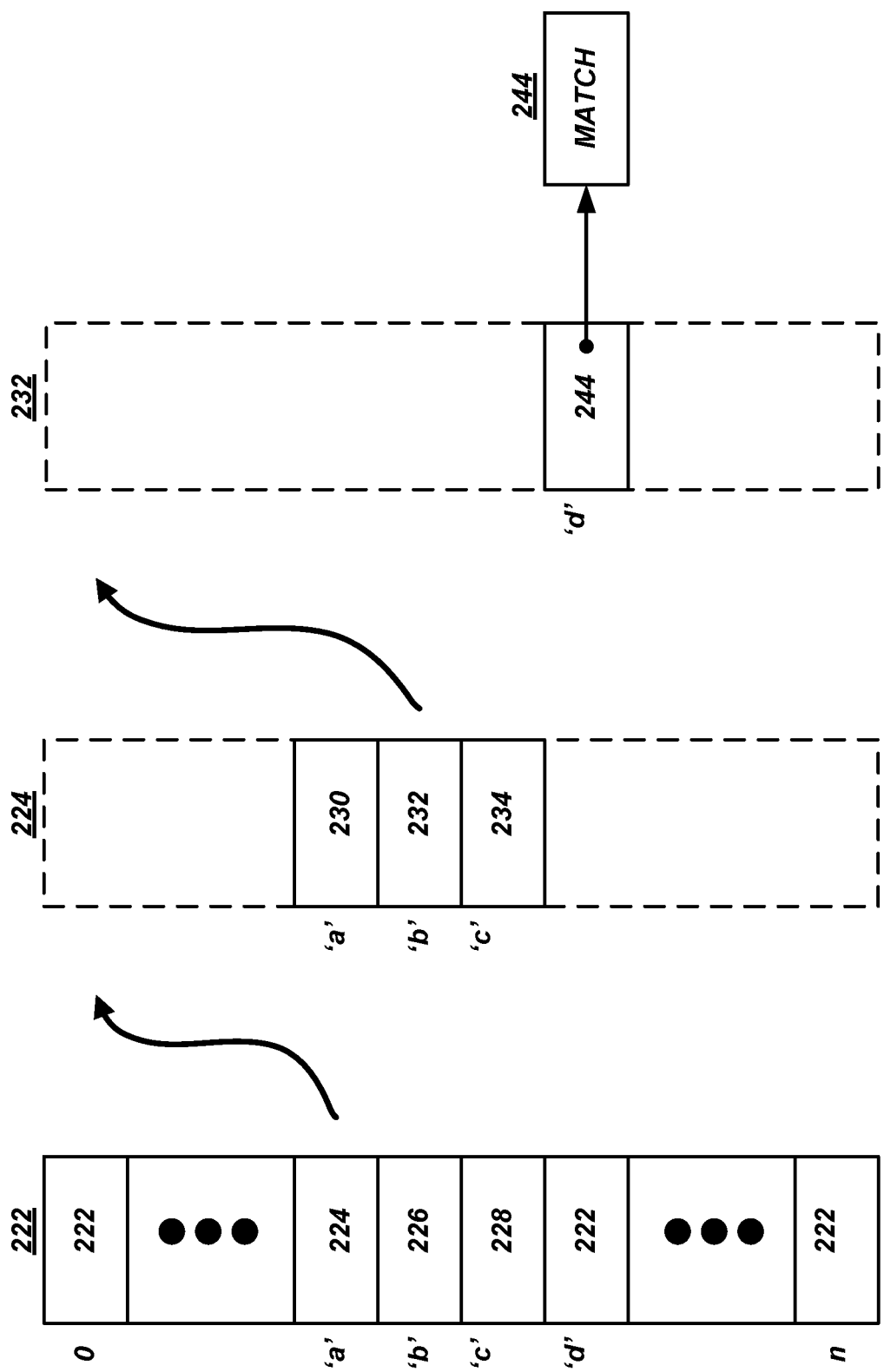
Figure 10C:
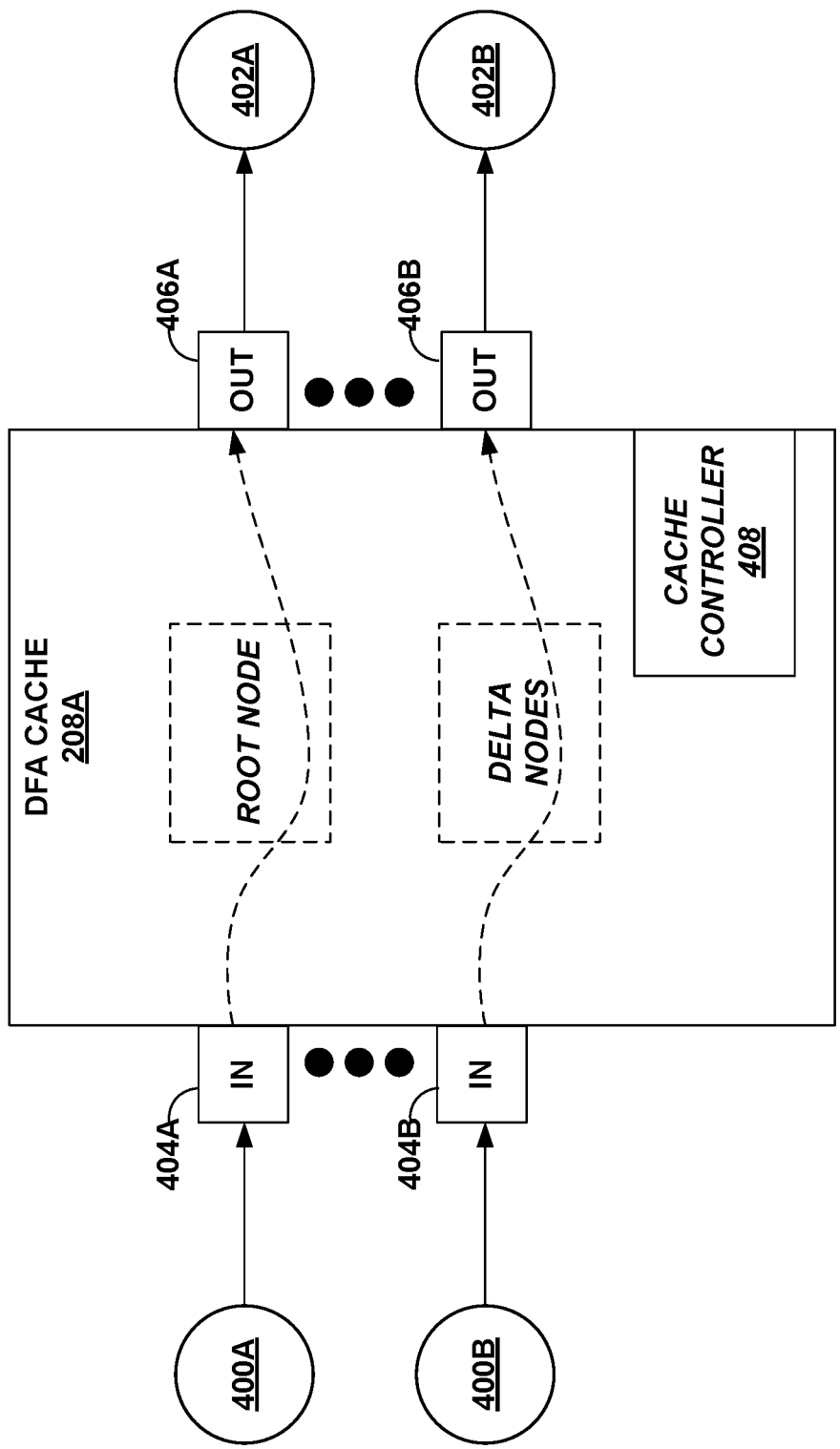
FIG. 10C is a conceptual diagram illustrating an example multi-port cache of an example RegEx accelerator, in accordance with the techniques of this disclosure.

FIGS. 10A and 10B are conceptual diagrams illustrating node representations of a DFA graph, in accordance with the techniques of this disclosure. FIG. 10C is a conceptual diagram illustrating an example multi-port cache of an example RegEx accelerator, in accordance with the techniques of this disclosure. FIG. 10D is a conceptual diagram illustrating logical views of a cache of an example RegEx accelerator, in accordance with the techniques of this disclosure. FIGS. 10A through 10D are described in the context of RegEx accelerator 200 of FIG. 5 and DFA graph 220 of FIG. 6A.

In the example of FIG. 10A, a processing unit of one of DFA engines 206 may maintain a respective node representation of each of the nodes of DFA graph 220, or a subset thereof. For example, FIG. 10A shows a representation of DFA nodes 222, 224, and 232. For each possible payload label, each node representation includes a corresponding arc exiting that node with that label, whether an arc actually exists in the DFA graph or not. In cases where no arc exists for a particular symbol, the node representation may include an arc back to a start or root node of DFA graph 220. In other cases where no arc exists for a particular symbol, the node representation may omit any arc value and instead RegEx accelerator 200 may consider a lack of arc value as an implicit instruction to return back to a start or root node of DFA graph 220.

Node 222 is a start node, also referred to as a root node, of DFA graph 220. The representation of node 222 of FIG. 10A includes a mapping, for every potential symbol, to a corresponding arc exiting node 222, including information about an arc to node 224 with label 'a', an arc to node 226 with label 'b', and an arc to node 222 with a label 'c'. The representation of node 224 of FIG. 10A includes a mapping, for every potential symbol, to a corresponding arc exiting node 224 including information about an arc to node 230 with label 'a', an arc to node 232 with label 'b', and an arc to node 234 with a label 'c'. Lastly, the representation of node 232 of FIG. 10A includes a mapping, for every potential symbol, to a corresponding arc exiting node 232, including information about a single arc to node 244. In the example of FIG. 10A, where any node from DFA graph 220 does not include an arc with a label matching a potential symbol, the corresponding node representation maps that potential symbol with a back to the root or reference node (e.g., node 222). In the example of FIG. 10A, string "abd" results in a match defined by node 244.

In operation, when evaluating string "abd", a processing unit of one of DFA engines 206 may evaluate each symbol (e.g., byte) in a payload "abd". Initially, the processing unit, may start with node representation 222 (e.g., a current node) and determine, from node representation 222, that a current symbol 'a', as defined by the node representation of node 222, maps to an arc to node 224. In response to determining that, for node 222, the symbol 'a' is assigned to an arc to node 224, the processing unit next uses node representation 224 to process symbol 'b' from the payload. The processing unit may determine that node representation 224 assigns the symbol 'b' to an arc to node 232. In response to determining that, for node 224, the symbol 'b' is assigned to an arc to node 232, the processing unit next evaluates symbol 'd' from the payload. The processing unit may determine, that node representation 232 assigns symbol 'd' to an arc to node 244. In response to determining that the symbol 'd' is assigned to an arc to node 244, the processing unit may output an indication of a match.

Now turning to FIG. 10B, in some examples, rather than maintaining an entire representation of each of the nodes of DFA graph 220, or a subset thereof, a processing unit of one of DFA engines 206 may perform "root optimization techniques" that minimize an amount of memory, in particular the amount of cache, that is consumed by the node representations of the nodes of DFA graph 220. That is, to reduce the amount of cache taken up by the arcs of the node representations of the nodes of DFA graph 220, the processing unit of one of DFA engines 206 may cache a complete representation (e.g., all arcs) of a root node of DFA graph 220 while only caching a partial representation (e.g., only some arcs) of each of the other (e.g., non-root) nodes of DFA graph 220, or a subset thereof, into one of DFA caches 208.

While described primarily as being a representation of a "root node", in some examples, RegEx accelerator 200 utilizes one or more representations of "reference nodes" to evaluate a regular expression in view of a DFA graph. That is, a reference node, may be some other non-root node of a DFA graph. A representation of a reference node may define any child node arcs that are the same as arcs of the reference node. For example, a representation of node 224 may be a reference node representation to nodes 230, 232, and 234. In some cases, a reference node representation includes an arc for every possible payload symbol. In other cases, the reference node representation only includes arcs for every possible payload symbol that do not return back to the reference node; instead, such arcs are considered to be implicitly defined by the reference node representation.

Each partial representation of a node (also sometimes referred to as a "delta node") may specify each arc that is not already specified or implied by the representation of the root node. In other words, a processing unit of one of DFA engines 206 may store in one of DFA caches 208, a root node representation for DFA graph 220 and a respective delta node representation for each node of DFA graph 220, other than the root node, where each respective delta node representation defines any arc exiting that node which is not already defined (explicitly or implicitly) in the representation of the root node. By caching only a root node representation and a delta node representation for each other node of DFA graph 220, the processing unit of one of DFA engines 206 may consume less cache of one of DFA caches 208 than if the processing unit cached a complete or full respective representation of each of the nodes of DFA graph 220, or a subset thereof, into one of DFA caches 208, as shown in FIG. 10A.

For example, FIG. 10B shows a representation of node 222, that is similar to the representation of node 222 of FIG. 10A, however in FIG. 10B, the arcs defined by the representation of node 222 are cached in one of DFA caches 208. The cached arcs of root node 222 of FIG. 10B includes an arc specified for every possible payload symbol except for any potential symbols that do not correspond to a label of an arc exiting root node 222 or for any symbols that define an arc that returns to the root node 222; in such a case, the symbol is left undefined by root node 222, thereby implying an arc back to root node 222.

In contrast to the example of FIG. 10A, the representations of nodes 224 and 232 of FIG. 10B are mere partial representations or delta node representations. Each of the delta node representations of nodes 224 and 232 includes less information (e.g., fewer arcs) than the corresponding node representations of nodes 224 and 232 of FIG. 10A. Each of the delta node representations of nodes 224 and 232 only includes information about arcs that are different than the arcs already defined (explicitly or implicitly) by the node representation of root node 222.

For example, the node representation of node 224 that is cached in one of DFA caches 208 only includes information about arcs exiting node 224, such as information about an arc to node 230 with label 'a', an arc to node 232 that matches symbol 'b', and an arc to node 234 with label 'c'. Likewise, the node representation of node 232 only includes information about an arc to node 244 with label 'd'. Unlike in the example of FIG. 10A, any potential symbol that does not correspond to a label of an arc exiting node 224 or exiting node 232 is left undefined by the delta node representations for nodes 224 and 232. In this way, a processing unit of one of DFA engines 206 may, when evaluating a payload symbol that is undefined by an arc of a delta node representation, rely on the representation of root node 222 to evaluate the symbol.

In one example, a processing unit of one of DFA engines 206 may evaluate payload "abd" using the representations of FIG. 10B. When evaluating payload "abd", the processing unit of one of DFA engines 206 may determine that symbol 'a', as defined by the representation of root node 222, maps to an arc to node 224. In response to determining that, for node 222, the symbol 'a' is assigned as the label of an arc to node 224, the processing unit may next determine the arc, as defined by the representation of node 224, that has a label corresponding to symbol 'b'. The processing unit may determine that an arc from node 224 to node 232 has a label 'b'. Next, the processing unit may determine the arc defined by the representation of node 232 that has a label corresponding to symbol 'd'. In response to determining that the label corresponding to symbol 'd' is assigned to an arc between node 232 and node 244, the processing unit may consume the current symbol and output an indication of a match.

In another example, a processing unit of one of DFA engines 206 may evaluate payload "abc" which does not result in a match associated with DFA graph 220. A processing unit of one of DFA engines 206 may determine the symbol 'a', as defined by the representation of root node 222, maps to an arc to node 224 symbol 'a'. In response to determining that, for node 222, the symbol 'a' is assigned to an arc to node 224, the processing unit goes on to determine the arc defined by the delta node representation of node 224 that corresponds to symbol 'b'. The processing unit may determine that the symbol 'b' is mapped to an arc to node 232. However, the processing unit may determine that the delta node representation of node 232 does not define an arc for the symbol 'c'. In response to determining that the symbol 'c' is undefined by the delta node representation of node 232, the processing unit may check the root node representation of node 222 to determine whether the root node representation maps an arc to the symbol 'c'. The processing unit may determine that symbol 'c' is also undefined by the root node representation for node 222, and may conclude that therefore, the root node representation for node 222 implicitly maps symbol 'c' to itself and may therefore output an indication of a no match for payload "abc".

By storing only a root or reference node representation and one or more delta node representations, the processing unit of one of DFA engines 206 may use less memory than if the processing unit stores a complete node representation for each node in DFA graph 220. However, a drawback of storing arcs of delta node representations only is that in cases where a current symbol is undefined by a delta node representation, the processing unit may be required to access memory twice. The processing unit may first accesses DFA caches 208 or memory to determine whether a current symbol is defined by a particular delta node representation. In cases where the current symbol is undefined by the particular delta node representation, the processing unit may perform a second access of DFA caches 208 or other memory, time to determine the root node definition for the current symbol. The second access may occur before or after the first access. In other examples, the second access may occur concurrently with the first access.

That is, rather than evaluating a delta node representation and a root node representation, sequentially (in any order), a processing unit of DFA engines 206 may instead perform speculative root node access, or simply "speculative access" techniques to evaluate a delta and root node representation in parallel. To match a current symbol, a processing unit of DFA engines 206 may speculatively access memory to match a current symbol by simultaneously (or nearly simultaneously) accessing a root node representation at the same time or nearly the same time that the processing unit accesses and a delta node representation. By accessing root and delta node representations at the same time (e.g., in parallel) as opposed to sequentially, a processing unit may evaluate a regular expression faster (e.g., in fewer clock cycles) than evaluating the regular expression through multiple, sequential accesses of the delta node and then the root node representation. In this way, if a current symbol is undefined by a particular delta node representation, the processing unit need not also access DFA cache 208 to determine the root node definition for the current symbol; the processing unit may instead have already evaluated the current symbol against the root node representation while the processing unit also evaluated the delta node representation.

The example multi-port cache of FIG. 10C may enable a processing unit of one of DFA engines 206 to perform speculative access, for instance, when both the root and delta node representation are stored in cache 208. FIG. 10C is just one example architecture. In other examples, other memory architectures may be used. For example, multiple single-port or multiple multi-port memories may be configured as a "multi-port cache" for purposes of performing speculative access.

In the example of FIG. 10C, an example of one of DFA caches 208 is shown as DFA cache 208A. Stored in DFA cache 208A are arcs of a root node representation of DFA graph 220 and arcs of one or more delta node representations of DFA graph 220. DFA cache 208A further includes two or more input ports 404A and 404B and two or more corresponding output ports 406A and 406B. In some examples, DFA cache 208A includes one output port for every input port. And in some examples, DFA cache 208A includes a different number of output ports as compared to input ports. And in some examples, DFA cache 208A is made up of multiple single port memories or multiple multi-port memories that are configured to be accessed in a similar way as a single, multiple-port cache. In any case, by having multiple input and output ports 404A, 404B, 406A, and 406B, a processing unit of one of DFA engines 206 can simultaneously access DFA cache 208 to evaluate a current symbol against the root node representation in parallel to evaluating the current symbol against a delta node representation.

For example, a processing unit of one of DFA engines 206 may input cache key 400A into input port 404A to evaluate a current symbol using the root node representation. At the same time, or nearly the same time (i.e., in parallel), the processing unit of one of DFA engines 206 may input cache key 400B into input port 404B to evaluate the current symbol using the delta node representations. Cache key 400A may specify a current node as being the root node and cache key 400B may specify a current node as being a non-root node associated with a delta node representation.

The processing unit may obtain result 402A from output port 406A which identifies an arc to a subsequent node associated with the current symbol, as is defined by the root node representation. At the same time, or nearly the same time that the processing unit obtains result 402A, the processing unit may obtain result 402B from output port 406B which identifies an arc to a subsequent node associated with the current symbol, as is defined by a delta node representation that maps to key 400B.

In some examples, a processing unit of one of DFA engines 206 may be configured to speculatively access DFA caches 208 to match a label of an arc to a current symbol of a payload, in response to identifying a root node representation in DFA caches 208. That is, speculatively accessing the delta and root node representations may only realize a performance gain over sequential access, if the root node representation is already loaded in DFA cache 208A. If not loaded into DFA cache 208A, the processing unit may be configured to, in response to not identifying the root node representation in DFA cache 208A, refrain from speculatively accessing DFA cache 208A to match the current symbol to an arc label. Instead, the processing unit may be configured to sequentially evaluate a current symbol against the root and delta node representations by accessing the root node representation in a level two cache or external memory to match the label after accessing any of the delta node representations to match the label. In some examples, in response to not identifying the root node representation in DFA cache 208A, the root node representation may be loaded into DFA cache 208A so that subsequent evaluations of DFA graph 220 can be performed using speculative access techniques described above.

In some examples, RegEx accelerator 200 may need to simultaneously support multiple DFA graphs. Therefore, RegEx accelerator 200 may need to maintain multiple root node representations and multiple sets of delta node representations (i.e., one root node representation and one set of delta node representations for each graph). Because the size of DFA cache 208A may not be sufficient to store all the root and delta node representations of multiple graphs, RegEx accelerator 200 may create a high-performance group of graphs and a low-performance or medium-performance group of graphs. For any graph in the high-performance group of graphs, RegEx accelerator 200 may store the root node representation for that graph in one of DFA caches 208. Storing a root node representation in one of DFA caches 208 may occur in response to a software event, at start up, or after failing to identify the root node representation (e.g., one time or with sufficient frequency) in one of DFA caches 208 during runtime. For any graph not in the high-performance group of graphs, RegEx accelerator 200 may store the root node representation for that low or medium performance graph in an external memory, such as external memory 210 of FIG. 5. Said differently, RegEx accelerator 200 may maintain a hierarchy of memories and caches and when a root node representation of a DFA graph is not stored in a cache that is sufficiently high in the memory hierarchy (e.g., in one of DFA caches 208), then RegEx accelerator may refrain from performing speculative root node access.

Although FIGS. 10A through 10D have been described above in the context of RegEx accelerator 200 and/or a processing unit of one of DFA engines 206, in some examples, the techniques described herein may be implemented by an intelligent cache controller 408 of RegEx accelerator 200, e.g., as shown in FIG. 10C. That is, DFA cache 208A may include a dedicated component, such as cache controller 408, that is configured to manage what gets stored in DFA cache 208A and when, so as to satisfy the conditions described above.

Turning to FIG. 10D, to further improve performance when evaluating an expression, RegEx accelerator 200 may cache at least one of: "effective arcs" or "negative arcs" so that subsequent evaluations can benefit from work already performed during previous evaluations.

As used herein, the term "effective arc" refers to an arc that has recently been evaluated to be a match to a previous, current symbol and does not lead back to a root or reference node. As the processing unit of one of DFA engines 206 evaluates a current symbol against a reference node or delta node representation, RegEx accelerator 200 may cache, at one of DFA caches 208, information about effective arcs and then rely on the cached effective arcs to evaluate a subsequent, current symbol. For example, while evaluating node RegEx accelerator 200 may determine that a current symbol 'b' matches an arc to node 232. In response, RegEx accelerator 200 may cache information indicating that whenever a current symbol is 'b', while evaluating node 224, the subsequent node is node 232, based on a previous evaluation.

As used herein, the term "negative arc" refers to an arc that has recently been evaluated to be a match to a previous, current symbol and does lead back to a root or reference node. As the processing unit of one of DFA engines 206 evaluates a current symbol against a reference node or delta node representation, RegEx accelerator 200 may determine that the current symbol does match a label of an arc that returns to a root or reference node. In response, RegEx accelerator 200 may cache, at one of DFA caches 208, information about a negative arc; i.e., an arc having a label that matches a current symbol and connects the current node to a root or reference node. For example, RegEx accelerator 200 may cache information indicating that when a current symbol is 'b' while evaluating node 232, the subsequent node is node 222.

In some cases, an effective arc or negative arc stored in cache 208 may be a resulting arc, but not necessarily a single arc from a DFA. For example, if a current symbol matches a label of a first arc that returns to a root node and then matches a destination arc of the root node that does not return to the root node again, the processing unit may simply store, as an effective arc, an arc to the destination node without storing any information about the intermediate return back to the root arc.

As demonstrated in FIG. 10D, by caching effective and/or negative arcs, a processing unit of one of DFA engines 206 may avoid doing speculative root access if during a current symbol evaluation, the processing unit determines that a matching arc for the current symbol is already cached as an effective or negative arc. In other words, when evaluating a current symbol against what is cached in one of DFA caches 208, if the one of DFA caches 208 returns a hit to a matching arc, then the processing unit need take no further action. However, if the one of DFA caches 208 fails to return a hit, the processing unit may continue to perform speculative root access against the information stored in the one of DFA caches 208.

FIG. 10D includes views of cache 208 at different points in time, relative to different cache keys derived from a payload. For example, cache 208 at time t0 is empty or cold and includes zero effective and zero negative arcs. At subsequent times, t1-t5, cache 208 includes information about the effective or negative arcs that have been traversed during the subsequent times. The payload being evaluated in FIG. 10D includes the string "ABCABD".

As shown in FIG. 10D, at time t0, a processing unit of one of DFA engines 206 may evaluate a symbol 'A' against the root node 222 representation (e.g., stored in a cache, external memory, buffer memory, or other memory). In response to determining that the symbol matches an arc from node 222 to node 224, the processing unit stores, as an effective arc, an indication of an arc with label 'A' from node 222 to node 224 at location x001 of cache 208.

At time t1, the processing unit may evaluate symbol 'B' against the node 224 representation (e.g., stored in a cache, external memory, buffer memory, or other memory). In addition to evaluating symbol 'B' against the representation of node 224, the processing unit may further evaluate the current symbol in view of the effective and negative arcs stored in cache 208. In some examples, the processing unit may evaluate a current symbol against cached effective and negative arcs prior, concurrent, or subsequent to evaluating the symbol against a current node representation. In other words, once cache 208 is no longer cold, the processing unit may access cache 208 before, while, or after accessing the node representation. In response to determining that the symbol 'B' does not match a label of any effective or negative arcs stored in cache 208, and further in response to determining that the symbol matches a label of an arc from node 224 to node 232, the processing unit stores, as an effective arc, an indication of an arc with label 'B' from node 224 to node 232 at location x002 of cache 208.

At time t2, the processing unit may evaluate symbol 'C' against the node 232 representation (e.g., stored in a cache, external memory, buffer memory, or other memory). In addition to evaluating symbol 'C' against the representation of node 232, the processing unit may further evaluate the current symbol in view of the effective and negative arcs stored in cache 208. In response to determining that the symbol 'C' does not match a label of any effective or negative arcs stored in cache 208, and further in response to determining that the symbol matches a label of an arc from node 232 back to root node 222, the processing unit stores, as a negative arc, an indication of an arc with label 'C' from node 232 to node 222 at location x003 of cache 208.

At time t3, the processing unit may again evaluate symbol 'A' against the node 222 representation (e.g., stored in a cache, external memory, buffer memory, or other memory). In addition to evaluating symbol 'A' against the representation of node 222, the processing unit may further evaluate the current symbol in view of the effective and negative arcs stored in cache 208. In response to determining that the symbol 'A does match a label of an effective stored at location x0001 in cache 208, the processing unit uses the effective arc from cache 208 to finish evaluating symbol 'A'.

Similarly, at time t4, the processing unit may again evaluate symbol 'B' against the node 222 representation (e.g., stored in a cache, external memory, buffer memory, or other memory). In addition to evaluating symbol 'B' against the representation of node 224, the processing unit may further evaluate the current symbol in view of the effective and negative arcs stored in cache 208. In response to determining that the symbol 'B' does match a label of an effective stored at location x0002 in cache 208, the processing unit uses the effective arc from cache 208 to finish evaluating symbol 'B'.

Finally, at time t5, the processing unit may evaluate symbol 'D' against the node 232 representation (e.g., stored in a cache, external memory, buffer memory, or other memory). In addition to evaluating symbol 'D' against the representation of node 232, the processing unit may further evaluate the current symbol in view of the effective and negative arcs stored in cache 208. In response to determining that the symbol 'D' does not match a label of any effective or negative arcs stored in cache 208, and further in response to determining that the symbol matches a label of an arc from node 232 to node 244, the processing unit stores, as an effective arc, an indication of an arc with label 'D' from node 232 to node 244 at location x004 of cache 208.

In this way, the processing unit may evaluate a payload more efficiently. By caching effective or negative arcs, the processing unit can potentially avoid performing repetitive, slower memory accesses, to evaluate current symbols against node representations that have already been used in previous evaluations, and may be stored outside of the cache. In other words, caching effective and negative arcs may enable the processing unit to evaluate a current payload more quickly and efficiently by relying on previous evaluations of previous current symbols in a current payload.

In some examples, the processing unit may refrain from storing effective or negative arcs if a node representation for a current node is stored in an intermediate memory, e.g., buffer memory, rather than external memory. In other words, if a cache miss of a particular effective arc will only result in an access to the intermediate memory, rather than external memory, the processing unit may save space in cache 208 and not store effective or negative arcs associated with that node representation. Conversely, when a node representation is stored in external memory as opposed to a faster intermediate memory, the processing unit may perform effective and negative arc caching as described above.

Various examples have been described. These and other examples are within the scope of the following claims.

What is claimed is:

1. A processing device comprising:
a memory including a discreet finite automata (DFA) buffer configured to store at least a portion of a DFA graph, the DFA graph comprising a plurality of nodes, each of the nodes having zero or more arcs each including a respective label and pointing to a respective subsequent node of the plurality of nodes, at least one of the plurality of nodes comprising a match node, wherein the at least portion of the DFA graph comprises one or more slots of a memory slice, the one or more slots comprising data representing one or more of the arcs for at least one node of the plurality of nodes; and
a DFA engine implemented in circuitry, the DFA engine comprising one or more DFA threads implemented in circuitry, each of the DFA threads comprising:
a current node memory storing a value representing a current node of the plurality of nodes in the DFA graph; and
a payload offset memory storing a value representing a position of a current symbol in a sequence of symbols of payload data,
the DFA engine further comprising a processing unit configured to:
determine a label of one of the arcs of the current node that matches the current symbol;
update the value of the current node memory to a value representative of the respective subsequent node of the one of the arcs having the label that matches the current symbol; and
increment the value of the payload offset memory, wherein in response to updating the value of the current node memory to correspond to the match node, the processing unit is configured to output an indication that the payload data has resulted in a match.

2. The processing device of claim 1, wherein the memory slice comprises a predetermined number of slots for storing data representative of at least some of the arcs of the current node, each of the slots storing data for at most one arc, and to determine the label of the one of the arcs of the current node that matches the current symbol, the processing unit of the DFA engine is further configured to:
retrieve a mode value for the current node representing whether the current node has more arcs than the predetermined number of slots;
when the mode value indicates that the current node has no more than the predetermined number of slots, compare labels of the arcs in the memory slice to the current symbol; and
when the mode value indicates that the current node has more than the predetermined number of slots:
determine one or more arcs stored in additional memory slices storing data for the arcs of the current node using one or more hash functions; and
compare labels of the arcs in the memory slice and the one or more additional slices to the current symbol.

3. The processing device of claim 2, wherein the processing device is configured to use the current symbol as a key for the one or more hash functions.

4. The processing device of claim 1, wherein the at least portion of the DFA graph comprises a first portion of the DFA graph, the processing device further comprising an interface to external memory, the external memory storing at least a second portion of the DFA graph, the second portion being different than the first portion.

5. The processing device of claim 4, wherein the DFA buffer is configured to store data for the DFA graph in first memory slices having a first size, and wherein the external memory is configured to store data for the DFA graph in second memory slices having a second size, the second size being different than the first size.

6. The processing device of claim 5, wherein the first size is smaller than the second size.

7. The processing device of claim 4, wherein data for the arcs further includes a locator value indicating whether the respective subsequent node is stored in the DFA buffer or the external memory.

8. The processing device of claim 1, wherein the at least portion of the DFA graph comprises a first portion of the DFA graph, the DFA engine further comprising a DFA cache configured to store at least a second portion of the DFA graph, the second portion being different than the first portion.

9. The processing device of claim 1, wherein the DFA engine comprises one of a plurality of DFA engines, further comprising a plurality of DFA caches, each of the DFA engines being associated with a respective one of the DFA caches.

10. The processing device of claim 1, further comprising a DFA programming interface configured to at least one of:
load the at least portion of the DFA graph into the DFA buffer;
unload the at least portion of the DFA graph from the DFA buffer; or
receive the payload data.

11. The processing device of claim 10, wherein the DFA programming interface is configured to load the at least portion of the DFA graph into the DFA buffer from memory external to the processing device.

12. The processing device of claim 10, wherein the DFA programming interface is configured to at least one of:
- receive a DFA load work unit comprising instructions to load the at least portion of the DFA graph into the DFA buffer;
- receive a DFA unload work unit comprising instructions to unload the at least portion of the DFA graph from the DFA buffer; or
- receive a DFA search work unit comprising instructions to receive the payload data, and wherein in response to receiving the DFA search work unit, the DFA engine is configured to:
  - select an idle DFA thread of the one or more DFA threads;
  - determine a location of the DFA graph;
  - determine a start node of the plurality of nodes of the DFA graph;
  - initialize the value of the current node memory according to the location of the DFA graph and the start node; and
  - initialize the value of the payload offset to correspond to an ordinal first symbol of the sequence of symbols.

13. The processing device of claim 1, wherein the DFA graph represents a set of one or more regular expressions used in at least one of virus detection, intrusion detection, intrusion prevention, search, or indexing.

14. A method comprising:
- storing, by a discreet finite automata (DFA) engine of a processing device, the DFA engine implemented in circuitry, at least a portion of a DFA graph to a DFA buffer of a memory, the DFA graph comprising a plurality of nodes, each of the nodes having zero or more arcs each including a respective label and pointing to a respective subsequent node of the plurality of nodes, at least one of the plurality of nodes comprising a match node, wherein storing the at least portion of the DFA graph comprises storing a memory slice comprising data representing one or more of the arcs for at least one node of the plurality of nodes;
- determining, by a DFA thread of the DFA engine, the DFA thread implemented in circuitry, a value of a current node memory representing a current node of the plurality of nodes in the DFA graph;
- determining, by the DFA thread, a value of a payload offset memory representing a position of current symbol in a sequence of symbols of payload data;
- determining, by the DFA thread, a label of one of the arcs of the current node that matches the current symbol;
- updating, by the DFA thread, the value of the current node memory to a value representative of the respective subsequent node of the one of the arcs having the label that matches the current symbol;
- incrementing, by the DFA thread, the value of the payload offset memory; and
- in response to updating the value of the current node memory to correspond to the match node, outputting, by the DFA thread, an indication that the payload data has resulted in a match.

15. The method of claim 14, wherein storing the at least portion of the DFA graph comprises storing a first portion of the DFA graph, the method further comprising retrieving, via an interface to external memory, at least a second portion of the DFA graph, the second portion being different than the first portion.

16. The method of claim 15, wherein the memory slice comprises a predetermined number of slots for storing data representative of at least some of the arcs of the current node, each of the slots storing data for at most one arc, and wherein determining the label of the one of the arcs of the current node that matches the current symbol comprises:
- retrieving a mode value for the current node representing whether the current node has more arcs than the predetermined number of slots;
- when the mode value indicates that the current node has no more than the predetermined number of slots, comparing labels of the arcs in the memory slice to the current symbol; and
- when the mode value indicates that the current node has more than the predetermined number of slots:
  - determining one or more arcs stored in additional memory slices storing data for the arcs of the current node using one or more hash functions; and
  - comparing labels of the arcs in the memory slice and the one or more additional slices to the current symbol.

17. The method of claim 16, wherein using the hash functions comprises using the current symbol as a key for the one or more hash functions.

18. The method of claim 14, wherein storing the at least portion of the DFA graph comprises storing a first portion of the DFA graph to the DFA buffer, the method further comprising storing at least a second portion of the DFA graph to a DFA cache associated with the DFA engine, the second portion being different than the first portion.

19. The method of claim 18, wherein the DFA buffer is configured to store data for the DFA graph in first memory slices having a first size, and wherein the external memory is configured to store data for the DFA graph in second memory slices having a second size, the second size being different than the first size.

20. The method of claim 19, wherein the first size is smaller than the second size.

21. The method of claim 18, wherein data for the arcs further includes a locator value indicating whether the respective subsequent node is stored in the DFA buffer or the external memory.

22. The method of claim 14, wherein storing the at least portion of the DFA graph comprises:
- receiving, via a DFA programming interface, a DFA load work unit comprising instructions to load the at least portion of the DFA graph into the DFA buffer; and
- in response to the DFA load work unit, retrieving the at least portion of the DFA graph and storing the at least portion of the DFA graph to the DFA buffer.

23. The method of claim 22, wherein retrieving comprises retrieving the at least portion of the DFA graph from memory external to the processing device.

24. The method of claim 14, further comprising:
- receiving a DFA unload work unit comprising instructions to unload the at least portion of the DFA graph from the DFA buffer; and
- in response to the DFA unload work unit, clearing the DFA buffer.

25. The method of claim 14, further comprising:
- receiving a DFA search work unit comprising instructions to receive the payload data; and
- in response to the DFA search work unit:
  - selecting, by the DFA engine, an idle DFA thread of the one or more DFA threads;
  - determining a location of the DFA graph;
  - determining a start node of the plurality of nodes of the DFA graph;

initializing the value of the current node memory according to the location of the DFA graph and the start node; and initializing the value of the payload offset to correspond to an ordinal first symbol of the sequence of symbols.

26. The method of claim 14, wherein the DFA engine comprises one of a plurality of DFA engines, each of the DFA engines being associated with a respective one of a plurality of DFA buffers.

27. The method of claim 14, wherein the DFA graph represents a set of one or more regular expressions used in at least one of virus detection, intrusion detection, intrusion prevention, search, or indexing.

28. A processing device comprising:
a processor configured to execute a compiler to compile a regular expression to form a deterministic finite automata (DFA) graph, the DFA graph comprising a plurality of nodes, each of the nodes having zero or more arcs each including a respective label and pointing to a respective subsequent node of the plurality of nodes, at least one of the plurality of nodes comprising a match node, and wherein the compiler is configured to allocate data for the nodes between buffer memory of one or more deterministic finite automata (DFA) engines of a regular expression accelerator unit and an external memory to the regular expression accelerator unit.

29. The processing device of claim 28, wherein the compiler is configured to allocate the data for the nodes in a breadth first order of the DFA graph.

30. The processing device of claim 28, wherein the buffer memory comprises first memory slices having a first number of slots for storing arc data, wherein the external memory comprises second memory slices having a second number of slots for storing arc data, and wherein the compiler is configured to determine, for each node of the DFA graph, whether to allocate data for arcs of the node to the buffer memory or the external memory, and whether to allocate the data for the arcs of the node in a fill mode when a number of arcs for the node is less than or equal to the number of slices for the buffer memory or the external memory or in a hash mode when the number of arcs for the nude is greater than the number of slices for the buffer memory or the external memory.

31. The processing device of claim 28, further comprising the regular expression accelerator unit and the external memory.

32. A processing device comprising:
a regular expression processing unit comprising a buffer memory, one or more deterministic finite automata (DFA) engines implemented in circuitry, and an interface to an external memory, at least one of the DFA engines being configured to store a first portion of a DFA graph in the buffer memory and a second portion in the external memory, the DFA graph comprising a plurality of nodes, each of the nodes having zero or more arcs each including a respective label and pointing to a respective subsequent node of the plurality of nodes, at least one of the plurality of nodes comprising a match node, wherein a first node of the DFA graph is stored in the buffer memory or the external memory in a hash mode such that arcs for the first node are stored in two or more memory slices of the buffer memory or the external memory according to one or more hash functions, and wherein a second node of the DFA graph is stored in the buffer memory or the external memory in a fill mode such that arcs for the second node are stored in one of the two or more memory slices.

33. The processing device of claim 32, wherein each hash bucket of the hash functions corresponds to a memory slice of the buffer memory or the hash memory, the memory slice being accessible through a single memory access.

34. The processing device of claim 32, wherein the first node comprises a mode value indicating that the arcs for the first node are stored in the hash mode.

35. The processing device of claim 32, wherein the second node comprises a mode value indicating that the arcs for the second node are stored in the fill mode and positions of data for the arcs in a corresponding memory slice.

36. The processing device of claim 32, wherein the DFA engines are further configured to perform a search of a payload of a packet using the DFA graph.

* * * * *